(12) United States Patent
Liu et al.

(10) Patent No.: US 12,066,920 B2
(45) Date of Patent: Aug. 20, 2024

(54) AUTOMATED SOFTWARE TESTING WITH REINFORCEMENT LEARNING

(71) Applicant: MICROSOFT TECHNOLOGY LICENSING, LLC, Redmond, WA (US)

(72) Inventors: Xiaoyan Liu, Bothell, WA (US); Steve K. Lim, Redmond, WA (US); Taylor Paul Spangler, Kirkland, WA (US); Kashyap Maheshkumar Patel, Bellevue, WA (US); Marc Mas Mezquita, Redmond, WA (US); Levent Ozgur, Seattle, WA (US); Timothy James Chapman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/854,640

(22) Filed: Jun. 30, 2022

(65) Prior Publication Data

US 2023/0367703 A1 Nov. 16, 2023

Related U.S. Application Data

(60) Provisional application No. 63/341,791, filed on May 13, 2022.

(51) Int. Cl.
G06F 11/36 (2006.01)
G06N 3/08 (2023.01)
G06N 3/10 (2006.01)

(52) U.S. Cl.
CPC ........ *G06F 11/3664* (2013.01); *G06F 11/368* (2013.01); *G06F 11/3688* (2013.01); *G06N 3/08* (2013.01); *G06N 3/10* (2013.01)

(58) Field of Classification Search
CPC ..... G06F 11/3688; G06F 11/3644; G06F 3/10
(Continued)

(56) References Cited

U.S. PATENT DOCUMENTS 9,536,191 B1 * 1/2017 Arel ................ G06N 20/00
9,792,397 B1 * 10/2017 Nagaraja ............ G06F 30/32
(Continued)

FOREIGN PATENT DOCUMENTS

CN 111949555 A 11/2020
CN 115357501 A 11/2022
(Continued)

OTHER PUBLICATIONS

Cao et al, "Automatic HMI Structure Exploration via Curiosity-Based Reinforcement Learning", IEEE, pp. 1151-1155 (Year: 2021).*
(Continued)

*Primary Examiner* — Anil Khatri
(74) *Attorney, Agent, or Firm* — Shook, Hardy & Bacon L.L.P.

(57) ABSTRACT

The technology described herein provides an automated software-testing platform that uses reinforcement learning to discover how to perform tasks used in testing. The technology described herein is able to perform quality testing even when prescribed paths to completing tasks are not provided. The reinforcement-learning agent is not directly supervised to take actions in any given situation, but rather learns which sequences of actions generate the most rewards through the observed states and rewards from the environment. In the software-testing environment, the state can be user interface features and actions are interactions with user interface elements. The testing system may recognize when a sought after state is achieved by comparing a new state to a reward criteria.

20 Claims, 11 Drawing Sheets

(58) Field of Classification Search
USPC .............................. 717/124–151; 706/12–45
See application file for complete search history.

(56) References Cited

U.S. PATENT DOCUMENTS

| | | | | |
|---|---|---|---|---|
| 10,346,741 | B2 * | 7/2019 | Mnih | G06N 3/092 |
| 10,467,029 | B1 | 11/2019 | Lin | |
| 10,733,501 | B2 * | 8/2020 | Silver | G06N 3/08 |
| 10,783,056 | B2 | 9/2020 | Raviv | |
| 10,802,864 | B2 | 10/2020 | Nag et al. | |
| 10,805,185 | B2 | 10/2020 | Kolar | |
| 10,891,219 | B1 | 1/2021 | Dimitropoulos | |
| 11,030,086 | B2 | 6/2021 | Tu | |
| 11,055,205 | B1 | 7/2021 | Chauhan | |
| 11,068,378 | B2 | 7/2021 | Mola | |
| 11,087,175 | B2 * | 8/2021 | Kim | G06N 3/084 |
| 11,465,650 | B2 * | 10/2022 | Saxena | G06F 30/15 |
| 11,487,648 | B2 | 11/2022 | Amin | |
| 11,520,675 | B2 | 12/2022 | Bryan | |
| 11,558,265 | B1 | 1/2023 | Poornachandran | |
| 11,561,690 | B2 | 1/2023 | Lekivetz | |
| 11,669,753 | B1 * | 6/2023 | Gupta | G06N 5/04 |
| | | | | 706/12 |
| 11,775,817 | B2 * | 10/2023 | Brandt | G06N 7/01 |
| | | | | 706/12 |
| 11,790,239 | B2 * | 10/2023 | Kour | G06N 3/088 |
| | | | | 706/23 |
| 11,853,901 | B2 * | 12/2023 | Ko | G06N 5/02 |
| 11,861,579 | B1 * | 1/2024 | Capers | G06Q 30/0202 |
| 11,889,819 | B2 * | 2/2024 | Worth | G06N 7/01 |
| 11,892,941 | B2 * | 2/2024 | Rao Pandu | G06F 11/3688 |
| 11,989,119 | B2 | 5/2024 | Bhat | |
| 2009/0300423 | A1 | 12/2009 | Ferris et al. | |
| 2018/0143891 | A1 | 5/2018 | Polisetty | |
| 2018/0260302 | A1 | 9/2018 | Mola et al. | |
| 2018/0293498 | A1 * | 10/2018 | Campos | G06N 3/04 |
| 2018/0329788 | A1 | 11/2018 | Blum et al. | |
| 2019/0188120 | A1 | 6/2019 | Luss | |
| 2019/0286546 | A1 | 9/2019 | Johnston et al. | |
| 2019/0287004 | A1 | 9/2019 | Bhoj | |
| 2020/0117563 | A1 | 4/2020 | Eichhorn | |
| 2020/0156243 | A1 | 5/2020 | Ghare et al. | |
| 2020/0159644 | A1 | 5/2020 | Beltran et al. | |
| 2020/0167687 | A1 | 5/2020 | Genc | |
| 2020/0278920 | A1 | 9/2020 | Khakare et al. | |
| 2020/0299001 | A1 | 9/2020 | Restifo | |
| 2021/0021480 | A1 | 1/2021 | Puttur et al. | |
| 2021/0064515 | A1 * | 3/2021 | Xu | G06N 3/08 |
| 2021/0073110 | A1 | 3/2021 | Vidal et al. | |
| 2021/0187733 | A1 | 6/2021 | Lee | |
| 2021/0232922 | A1 | 7/2021 | Zhang et al. | |
| 2021/0279577 | A1 | 9/2021 | West et al. | |
| 2021/0334696 | A1 | 10/2021 | Traut et al. | |
| 2021/0405727 | A1 | 12/2021 | Singh et al. | |
| 2021/0406158 | A1 | 12/2021 | Yu | |
| 2022/0050766 | A1 | 2/2022 | Tate | |
| 2022/0222047 | A1 | 7/2022 | Todirel et al. | |
| 2023/0195601 | A1 | 6/2023 | Rajesh | |
| 2023/0297742 | A1 | 9/2023 | Wellens | |
| 2023/0367696 | A1 | 11/2023 | Liu | |
| 2023/0367697 | A1 | 11/2023 | Liu | |
| 2023/0367699 | A1 | 11/2023 | Dietrich | |
| 2023/0394758 | A1 | 12/2023 | Fu | |
| 2023/0418726 | A1 | 12/2023 | Migacz | |
| 2023/0419113 | A1 | 12/2023 | Genc | |
| 2024/0069907 | A1 | 2/2024 | Groenewegen | |
| 2024/0176726 | A1 | 5/2024 | Lemberg | |

FOREIGN PATENT DOCUMENTS

| | | |
|---|---|---|
| EP | 3902314 A1 | 10/2021 |
| WO | 2021058626 A1 | 4/2021 |
| WO | 2021062226 A1 | 4/2021 |

OTHER PUBLICATIONS

Huurman et al, "Generating API Test Data Using Deep Reinforcement Learning", IEEE, pp. 541-544 (Year: 2020).*

Nguyen et al, Prioritizing automated user interface tests using reinforcement learning, ACM, pp. 1-10 (Year: 2019).*

Kuznetsov et al, "Automated Software Vulnerability Testing Using Deep Learning Methods", IEEE, pp. 837-841 (Year: 2019).*

Pan et al, "Reinforcement Learning Based Curiosity-Driven Testing of Android Applications", ACM, pp. 153-164 (Year: 2020).*

Zheng et al, "Wuji: Automatic Online Combat Game Testing Using Evolutionary Deep Reinforcement Learning", IEEE, pp. 772-784 (Year: 2019).*

Eskonen, et al., "Automating GUI Testing with Image-Based Deep Reinforcement Learning", In Proceedings of IEEE International Conference on Autonomic Computing and Self-Organizing Systems, Aug. 17, 2020, pp. 160-167.

"International Search Report and Written Opinion Issued in PCT Application No. PCT/US23/013377", Mailed Date: Jun. 12, 2023, 11 Pages.

"International Search Report and Written Opinion Issued in PCT Application No. PCT/US23/013378", Mailed Date: Jun. 7, 2023, 13 Pages.

Romdhana, et al., "Deep Reinforcement Learning for Black-Box Testing of Android Apps", In Repository of arXiv:2101.02636v1, Jan. 7, 2021, 26 Pages.

U.S. Appl. No. 63/341,791, filed May 13, 2022.

U.S. Appl. No. 17/855,240, filed Jun. 30, 2022.

U.S. Appl. No. 17/855,434, filed Jun. 30, 2022.

U.S. Appl. No. 17/948,513, filed Sep. 20, 2022.

Zheng, et al., "Wuji: Automatic online combat game testing using evolutionary deep reinforcement learning", In Proceedings of 34th IEEE/ACM International Conference on Automated Software Engineering, Nov. 11, 2019, pp. 772-784.

Su, et al., "Guided, stochastic model-based GUI testing of android apps", In Proceedings of 11th Joint Meeting on Foundations of Software Engineering, Sep. 4, 2017, pp. 245-256.

Sutton, et al., "Reinforcement Learning: An Introduction", In Publication of the MIT Press, Jan. 1, 2018, 444 Pages.

Terry, J K., "Using PettingZoo with RLlib for Multi-Agent Deep Reinforcement Learning", Retrieved from: https://towardsdatascience.com/using-pettingzoo-with-rllib-for-multi-agent-deep-reinforcement-learning-5ff47c677abd, Sep. 25, 2021, 16 Pages.

Catovic, et al., "Linnaeus: A highly reusable and adaptable ML Based Log Classification Pipeline", In Repository of arXiv:2103.06927v1, Mar. 11, 2021, 8 Pages.

Collins, et al., "Deep Reinforcement Learning based Android Application GUI Testing", In Proceedings of Cyber Security Experimentation and Test Workshop, Sep. 21, 2017, pp. 186-194.

"International Search Report and Written Opinion Issued in PCT Application No. PCT/US23/015988", Mailed Date: Jun. 28, 2023, 14 Pages.

"International Search Report and Written Opinion Issued in PCT Application No. PCT/US23/017013", Mailed Date: Jun. 30, 2023, 14 Pages.

Non-Final Office Action mailed on Feb. 9, 2024, in U.S. Appl. No. 17/855,240, 20 pages.

Notice of Allowance mailed on Feb. 6, 2024 in U.S. Appl. No. 17/855,434, 10 Pages.

Pang, et al., "A simulator for reinforcement learning training in the recommendation field," IEEE International conference on Parallel and Distributed Processing with Applications, 2020, 06 Pages.

"Non Final Office Action Issued in U.S. Appl. No. 17/855,434", Mailed Date: Oct. 10, 2023, 8 Pages.

"Get started with Robo tests", Retrieved from: https://web.archive.org/web/20220324090129/https://firebase.google.com/docs/test-lab/android/robo-ux-test, Mar. 24, 2022, 6 Pages.

"Gym", Retrieved from: https://web.archive.org/web/20220415123137/https:/gym.openai.com/, Apr. 15, 2022, 3 Pages.

Microsoft, "ray-on-aml", Retrieved from: https://web.archive.org/web/20220418071031/https://github.com/microsoft/ray-on-aml/, Apr. 18, 2022, 7 Pages.

(56) References Cited

OTHER PUBLICATIONS

"RLlib: Industry-Grade Reinforcement Learning", Retrieved from: https://web.archive.org/web/20220418140512/https:/docs.ray.io/en/latest/rllib/index.html, Apr. 18, 2022, 4 Pages.

"Stanford Research Institute Problem Solver", Retrieved from: https://en.wikipedia.org/wiki/Stanford_Research_Institute_Problem_Solver, Aug. 9, 2021, 4 Pages.

"UI/Application Exerciser Monkey", Retrieved from: https://web.archive.org/web/20220318102138/https://developer.android.com/studio/test/other-testing-tools/monkey, Mar. 18, 2022, 5 Pages.

Afridi, et al., "Deep Reinforcement Learning Approach for Inventory Policy Tested in Simulation Environment", In Proceedings of the Winter Simulation Conference, Dec. 14, 2020, 4 Pages.

Akkaya, et al., "Solving rubik's cube with a robot hand", In Repository of arXiv:1910.07113v1, Oct. 16, 2019, 51 Pages.

Amalfitano, et al., "Using gui ripping for automated testing of android applications", In Proceedings of the 27th EEE/ACM International Conference on Automated Software Engineering, Sep. 3, 2012, pp. 258-261.

Anand, et al., "Automated concolic testing of smartphone apps", In Proceedings of the ACM SIGSOFT 20th International Symposium on the Foundations of Software Engineering, Nov. 11, 2012, pp. 1-11.

Andrychowicz, et al., "Hindsight experience replay", In Repository of arXiv:1707.01495v1, Jul. 5, 2017, 15 Pages.

Bengio, et al., "Curriculum learning", In Proceedings of the 26th Annual International Conference on Machine Learning, Jun. 14, 2009, pp. 41-48.

Blackmist, et al., "Reinforcement learning (preview) with Azure Machine Learning", Retrieved from: https://docs.microsoft.com/en-US/azure/machine-learning/how-to-use-reinforcement-learning, Apr. 1, 2022, 14 Pages.

Borges, et al., "Guiding app testing with mined interaction models", In Proceedings of IEEE/ACM 5th International Conference on Mobile Software Engineering and Systems, May 27, 2018, pp. 133-143.

Bridge, et al., "Event Tracing", Retrieved from: https://docs.microsoft.com/en-us/windows/win32/etw/event-tracing-portal, Jan. 8, 2021, 3 Pages.

Cao, et al., "Crawldroid: Effective model-based gui testing of android apps", In Proceedings of the Tenth Asia-Pacific Symposium on Internetware, Sep. 16, 2018, 6 Pages.

Chen, et al., "Learning action-transferable policy with action embedding", In Repository of arXiv preprint arXiv:1909.02291, May 10, 2021, 11 Pages.

Colas, et al., "Curious: Intrinsically motivated modular multi-goal reinforcement learning", In Repository of arXiv:1810.06284v1, Oct. 15, 2018, 9 Pages.

Gao, et al., "Android testing via synthetic symbolic execution", In Proceedings of 33rd IEEE/ACM International Conference on Automated Software Engineering, Sep. 3, 2018, pp. 419-429.

George, et al., "Microsoft UI Automation", Retrieved from: https://docs.microsoft.com/en-us/dotnet/framework/ui-automation/, Sep. 15, 2021, 2 Pages.

Graves, et al., "Automated curriculum learning for neural networks", In International conference on machine learning, Jul. 17, 2017, 10 Pages.

Halfin, et al., "Give feedback with the Feedback Hub", Retrieved from: https://docs.microsoft.com/en-us/windows-insider/feedback-hub/feedback-hub-app, Mar. 26, 2021, 13 Pages.

Harries, et al., "Drift: Deep reinforcement learning for functional software testing", In Proceedings of 33rd Deep Reinforcement Learning Workshop, Jul. 16, 2020, 10 Pages.

Hessel, et al., "Multi-task deep reinforcement learning with popart", In Proceedings of the AAAI Conference on Artificial Intelligence, Jul. 17, 2019, pp. 3796-3803.

Jamrozik, et al., "Droidmate: a robust and extensible test generator for android", In Proceedings of the International Conference on Mobile Software Engineering and Systems, May 14, 2016, pp. 293-294.

Li, et al., "Humanoid: A deep learning-based approach to automated black-box android app testing", In Proceedings of 34th IEEE/ACM International Conference on Automated Software Engineering, Nov. 11, 2019, pp. 1070-1073.

Liang, et al., "RLlib: Abstractions for distributed reinforcement learning", In Proceedings of International Conference on Machine Learning, Jul. 3, 2018, 10 Pages.

Lin, et al., "Test transfer across mobile apps through semantic mapping", In Proceedings of 34th IEEE/ACM International Conference on Automated Software Engineering, Nov. 11, 2019, pp. 42-53.

Machiry, et al., "Dynodroid: An input generation system for android apps", In Proceedings of the 9th Joint Meeting on Foundations of Software Engineering, Aug. 18, 2013, pp. 224-234.

Mahmood, et al., "Evodroid: Segmented evolutionary testing of android apps", In Proceedings of the 22nd ACM SIGSOFT International Symposium on Foundations of Software Engineering, Nov. 11, 2014, pp. 599-609.

Mao, et al., "Sapienz: Multiobjective automated testing for android applications", In Proceedings of the 25th International Symposium on Software Testing and Analysis, Jul. 18, 2018, pp. 94-105.

Mariani, et al., "Autoblacktest: Automatic black-box testing of interactive applications", In Proceedings of IEEE fifth International conference on software testing, verification and validation, Apr. 17, 2012, pp. 81-90.

Marshall, et al., "Application Verifier—Overview", Retrieved from: https://docs.microsoft.com/en-us/windows-hardware/drivers/devtest/application-verifier, Mar. 26, 2022, 8 Pages.

Marshall, et al., "Driver Verifier", Retrieved from: https://docs.microsoft.com/en-us/windows-hardware/drivers/devtest/driver-verifier, Dec. 15, 2021, 8 Pages.

Mnih, et al., "Playing Atari with Deep Reinforcement Learning", In Repository of arXiv:1312.5602v1, Dec. 19, 2013, 9 Pages.

Yazdanbakhsh, et al., "Massively Large-Scale Distributed Reinforcement Learning with Menger", Retrieved from: https://ai.googleblog.com/2020/10/massively-large-scale-distributed.html, Oct. 2, 2020, 6 Pages.

Mohammed, et al., "An empirical comparison between monkey testing and human testing (wip paper)", In Proceedings of the 20th ACM SIGPLAN/SIGBED International Conference on Languages, Jun. 23, 2019, pp. 188-192.

Narvekar, et al., "Curriculum learning for reinforcement learning domains: A framework and survey", In Journal of Machine Learning Research, vol. 21, Jul. 2020, pp. 1-50.

Pan, et al., "Reinforcement learning based curiosity-driven testing of android applications", In Proceedings of the 29th ACM SIGSOFT International Symposium on Software Testing and Analysis, Jul. 18, 2020, pp. 153-164.

Parisotto, et al., "Actormimic: Deep multitask and transfer reinforcement learning", In Repository of arXiv:1511.06342v1, Nov. 19, 2015, pp. 1-15.

Patel, et al., "On the effectiveness of random testing for android: or how i learned to stop worrying and love the monkey", In Proceedings of the 13th International Workshop on Automation of Software Test, May 28, 2018, pp. 34-37.

Portelas, et al., "Automatic Curriculum Learning for Deep RL: A Short Survey", In Repository of arXiv:2003.04664v2, May 28, 2020, 8 Pages.

Portelas, et al., "Teacher algorithms for curriculum learning of deep rl in continuously parameterized environments", In Conference on Robot Learning, Oct. 16, 2019, pp. 1-19.

Pouyanfar, et al., "A survey on deep learning: Algorithms, techniques, and applications", In Proceedings of ACM Computing Surveys, vol. 51, No. 5, Sep. 2018, 36 Pages.

Pritz, et al., "Jointly-Learned State-Action Embedding for Efficient Reinforcement Learning", In Proceedings of the 30th ACM International Conference on Information \& Knowledge Management, Nov. 1, 2021, pp. 1447-1456.

Resende, Pedro Tomas Mendes, "Reinforcement Learning of Task Plans for Real Robot Systems", In Thesis of Master of Science Degree in Electrical and Computer Engineering, Oct. 2014, 107 Pages.

(56) References Cited

OTHER PUBLICATIONS

Schulman, et al., "Proximal Policy Optimization Algorithms", In Repository of arXiv:1707.06347v2, Aug. 28, 2017, 12 Pages.

Zheng, et al., "Automatic Web Testing Using Curiosity-Driven Reinforcement Learning", In Repository of arXiv:2103.06018v1, Mar. 10, 2021, 13 Pages.

Shim, et al., "What are virtual machine scale sets?", Retrieved from: https://docs.microsoft.com/en-us/azure/virtual-machine-scale-sets/overview, Nov. 2, 2021, 5 Pages.

Spieker, et al., "Reinforcement learning for automatic test case prioritization and selection in continuous integration", In Proceedings of the 26th ACM SIGSOFT International Symposium on Software Testing and Analysis, Jul. 10, 2017, pp. 12-22.

Final Office Action mailed on Jun. 17, 2024, in U.S. Appl. No. 17/855,240, 23 pages.

Non-Final Office Action mailed on Jun. 17, 2024, in U.S. Appl. No. 17/948,513, 15 pages.

US-2023-0367696-A1, filed Nov. 16, 2023.
US-2023-0367697-A1, filed Nov. 16, 2023.
US-2023-0367699-A1, filed Nov. 16, 2023.

* cited by examiner

AUTOMATED SOFTWARE TESTING WITH REINFORCEMENT LEARNING

CROSS-REFERENCE TO RELATED APPLICATIONS

This application claims the benefit of U.S. Provisional Application No. 63/341,791, filed May 13, 2022, which is incorporated herein by reference in its entirety.

BACKGROUND

Automated software testing for complex environments, such as operating systems or the applications running thereon, should simulate the broad diversity of ways that users interact with the software being tested. Simulated usage during testing allows for detection of bugs before they turn into usability or security issues after deployment. Simulated usage should be representative of scenarios that are known to produce bugs, while providing enough variety to push the software being tested and/or the operating system into a broad range of plausible states. Similarly, automated testing should test as many possible interaction scenarios as possible.

Some systems rely on heuristically driven methodologies, such as generating random events or machine learning-based approaches to navigate interfaces. Despite the adoption of these methodologies in testing, limitations still exist. For example, some machine-learning based models only exploit historically observed paths during testing, where in many cases bugs or scenarios are found in paths that have not been observed before. Existing machine-learning models may not effectively learn how to follow paths that are different from previously observed paths.

SUMMARY

The technology described herein provides an automated software-testing platform that uses reinforcement learning to discover how to perform tasks used in testing. The technology described herein is able to perform quality testing even when prescribed paths to completing tasks are not provided. The reinforcement-learning method described herein is particularly effective at learning how to complete complex tasks. Other methods of discovering how to perform tasks, such as random walk, can learn simple tasks that require only a few consecutive interactions to accomplish. However, existing methods are inefficient at discovering how complex tasks are performed. Once a testing system learns how to perform a task, such as emailing a picture, this process can be automatically performed by a testing agent to determine whether performance of the task creates an unhealthy condition in the system or software being tested.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features, and actions may include interactions with user interface elements.

The testing system may recognize when a sought after state is achieved by comparing a new state to a reward criteria. The reward criteria are defined to reflect the sought after result. In one example, the sought after states represent scenario completions, such as the completion of a task within the software being tested. A task may be, for example, taking a picture, entering text, bolding text, or any number of other possible tasks. Many of these tasks may require a sequence of multiple interactions.

The technology described herein can successfully reproduce multiple scenarios simultaneously at scale with improved efficiency compared to random testing and existing machine-learning-model based testing to find bugs that affect user experiences. Existing machine-learning models may not effectively learn how to follow paths that are different from previously observed paths. In addition, the technology may employ a scale of tens to thousands of virtual and/or physical workers to emulate how users will interact with applications.

In aspects, the reinforcement learning occurs in an undefined action space. The action space is the set of all actions that the testing platform can take on the software being tested. When testing user interface features, an action may include an interaction with an interface element (e.g., button, menu, text box, on-screen object). In an undefined action space, the actions available to the testing platform outside of the current state are initially unknown to the testing platform. Further, the programmed state change that should result from taking available actions from the current state is also unknown to the testing platform. This is in contrast to many existing testing systems that require a developer to provide a defined action space to facilitate testing.

BRIEF DESCRIPTION OF THE DRAWINGS

The present invention is described in detail below with reference to the attached drawing figures, wherein.

DETAILED DESCRIPTION

Figure 1:
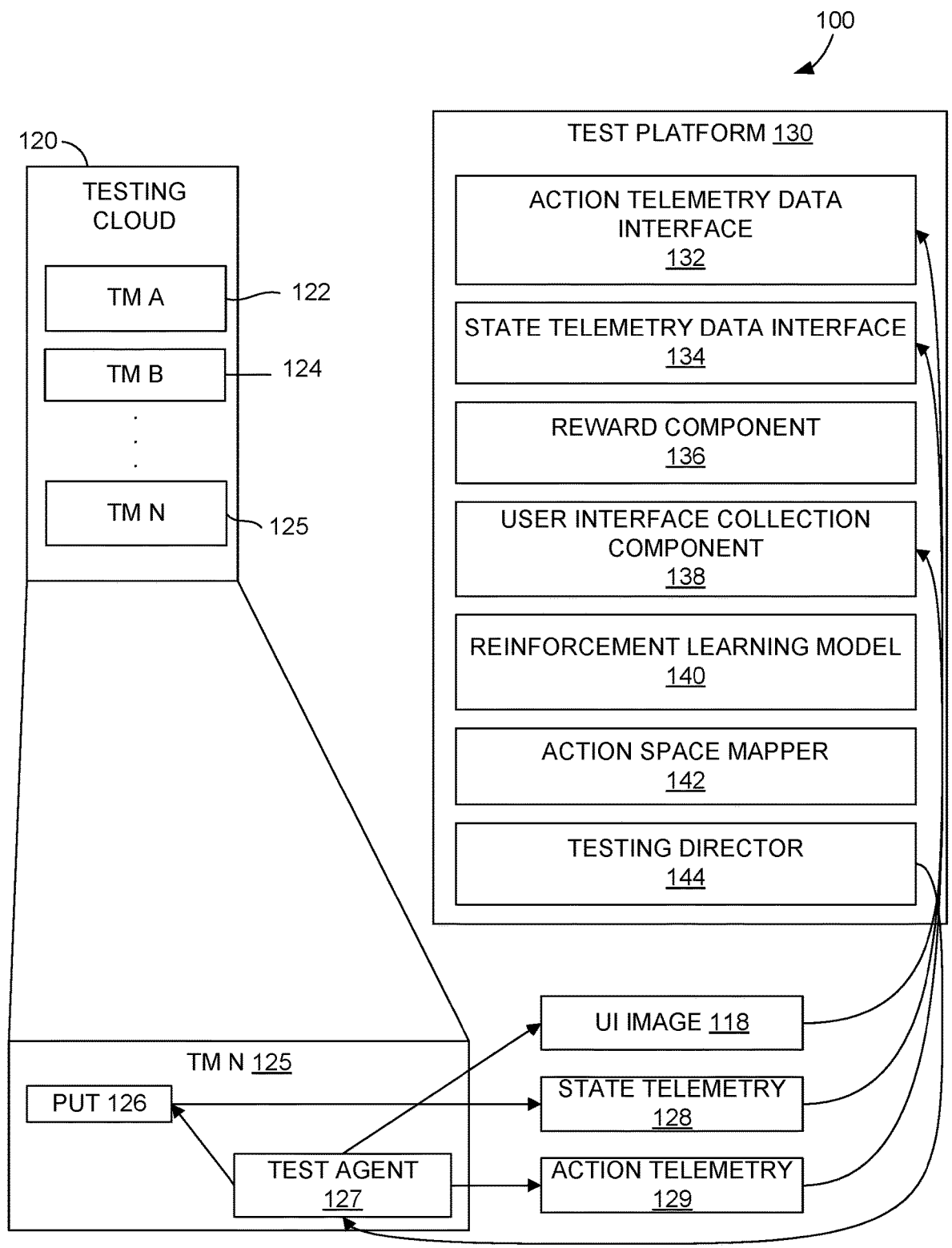
FIG. 1 is a block diagram of a reinforcement learning, software testing environment, in accordance with aspects of the technology described herein.

The technology described herein provides an automated software-testing platform that uses reinforcement learning to discover how to perform tasks used in testing. The technology described herein is able to perform quality testing even when prescribed paths to completing tasks are not provided. The reinforcement-learning method described herein is particularly effective at learning how to complete complex tasks. Other methods of discovering how to perform tasks, such as random walk, can learn simple tasks that require only a few consecutive interactions to accomplish. However, existing methods inefficiently discover how complex tasks are performed. Once a testing system learns how to perform a task, such as emailing a picture, this process can be automatically performed by a testing agent to determine whether performance of the task creates an unhealthy condition in the system or software being tested. Unhealthy conditions can include hangs, crashes, and other abnormal conditions or undesirable conditions.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features and actions may include interactions with user interface elements. These state, action, and reward concepts may be formally represented by the finite Markov decision processes (MDP) for sequential decision making. An MDP is a tuple <S, A, T, R, γ> where S is a finite set of states, A is a finite set of actions, T is a state transition function, R is a reward function and γ is a discount factor.

The testing system may recognize when a sought after state is achieved by comparing a new state to a reward criteria. The reward criteria are defined to reflect the sought after result. In one example, the sought after states represent scenario completions, such as the completion of a task within the software being tested. A task may be, for example, taking a picture, entering text, bolding text, or any number of other possible tasks. Many of these tasks may require a sequence of multiple interactions. For example, a task may require opening a menu, selecting a menu item, providing input, and then selecting an enter button. In contrast, simply opening a menu interface and then closing the same interface, without additional interactions, may be an example of failing to complete a scenario. Again, the sought after state may be defined by a reward criteria and assigned a reward value when produced by the testing agent.

Automated software testing at scale for complex environments like operating systems or services benefit from high-quality testing experiences that mimic user actions, given the broad diversity of ways that users interact with their devices. The various methods users take to perform a task may not be observable for technical reasons and/or privacy reasons. An outcome generated by user actions to achieve a final state may be observable, but how users got to that final state may be unknown and therefore unusable for playback software testing. Playback testing records the activity of the user and then repeats it during testing. For example, actions a user takes to bold text could be recorded. A playback tool will record the actions and save them in a repeatable test that be run as pan of future testing. Reinforcement learning can help build a set of possible actions to achieve the desired state. The set of possible actions can be used to determine whether various methods of completing a task are bug free. Traditional approaches that focus on randomly interacting with user interfaces to cover all the combinations of input is extremely inefficient, translating into poor coverage and throughput; conversely, scripted testing does not provide significant user interaction variation to provide broad coverage. These and other problems are solved herein through a multi-task reinforcement-learning framework that is usable for large-scale automated software testing.

The technology described herein can successfully reproduce multiple scenarios simultaneously at scale with improved efficiency compared to random testing and machine learning model based testing to find bugs that affect user experiences. In addition, the technology also may employ a scale of tens to thousands of virtual and/or physical workers residing on physical hardware or on virtual machines to emulate how users will interact with applications.

Reinforcement learning (RL) offers inherent mechanisms to be effective for these challenges. The balance of exploration and exploitation helps discover paths through the user interface (UI) that are bounded to plausible paths without needing human (and potentially private) data. Exploitation takes the most rewarding action given current knowledge, while exploration takes an action to gather more knowledge. In addition, reinforcement learning also provides resiliency relative to more static testing, as underlying code and user interfaces continually evolve and vary due to code updates from developers and experiments run by engineering teams. As a result, reinforcement learning can be used to generalize across subtle changes in the action space for the same rewards over time.

The technology described herein may train a reinforcement-learning model to perform multiple tasks. In general, a goal of reinforcement learning is to learn one specific task at a time. Multitask reinforcement-learning aims to learn a single task conditioned policy $\pi$ (a|s, z), where s represents current state and z represents a task. The idea behind multitask reinforcement learning is that the knowledge learned from training one task can be transferred to the training of other tasks. When training networks with multiple tasks jointly, the agents may learn to share and reuse components across different tasks. Such sharing and reuse provides higher overall efficiency and more enables generation of more complex sequencing of tasks to replicate human behavior when multiple tasks are involved.

In aspects, the reinforcement learning occurs in an undefined action space. The action space is the set of all actions that the testing platform can take on the software being tested. When testing user interface features, an action may include an interaction with an interface element (e.g., button, menu). In an undefined action space, the actions available to the testing platform outside of the current state are initially unknown to the testing platform. Further, the programmed state change that should result from taking available actions from the current state is also unknown to the testing platform. This is in contrast to many existing testing systems that require a developer to provide a defined action space to facilitate testing.

The technology described herein improves upon existing testing technology in several ways, including by making efficient use of computer resources. The techniques may use a least, minimal, or reduced amount of computing resources to find a greater, greatest, and/or more varied amount of problems in the software being tested. The technology described herein takes the software being tested and reward criteria as the primary inputs. In contrast, many existing technologies also require the action space to be defined as part of the input. Many existing technologies also receive various action patterns to guide the testing. These inputs are typically provided with the goal of making efficient use of the testing resources and to provide high effectiveness.

However, errors in either the provided action space or action patterns will reduce the effectiveness of current testing methods by causing areas of the software to be omitted from testing (if part of the action space is missing) or for testing errors to occur if the action space includes portions not in the actual software. These input errors occur as various versions of the software progress without corresponding updates being made to the testing inputs.

The technology described herein maintains high efficiency and effectiveness without requiring these same inputs. As a result, the technology described herein also avoids ineffectiveness caused by errors in the action space or action patterns typically provided as input. As described above, the technology described herein learns how to perform tasks and then performs those tasks as part of testing. As the system learns, more testing resources can be used to test known spaces and known patterns and fewer resources dedicated to exploration.

Automated Testing Environment

Turning now to FIG. 1, an exemplary software-testing environment 100 is shown, according to an aspect of the technology described herein. Among other components not shown, the software testing environment 100 includes a testing cloud 120 with test machine A 122, test machine B 124, and test machine N 125, and test platform 130, all connected by a computer network. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Each of the components shown in FIG. 1 may be implemented via any type of computing device, such as computing device 1100 described in connection to FIG. 11. These components may communicate with each other via a network, which may include, without limitation, one or more local area networks (LANs) and/or wide area networks (WANs). In exemplary implementations, a network comprises the Internet and/or a cellular network, amongst any of a variety of possible public and/or private networks.

Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 100, it is contemplated that in some aspects functionality of these components can be shared or distributed across other components.

The technology described herein includes a framework in which the agent interacts with a plurality of test machines (e.g., 30, 60, 100, 1000) simultaneously to collect test data. Each test machine 125 has an operating system and a product under test 126 (e.g., MICROSOFT WORD) pre-installed. The testing agent 127 opens the product under test (PUT) 126 and starts to interact with the product under a test interface. The testing agent 127 observes the current state within the environment, takes an action, and observes the next state.

The testing cloud environment 120 includes test machine A 122, test machine B 124, and test machine N 125. The N designation on test machine N 125 is intended to indicate that any number of test machines may be used in the testing cloud 120. Each test machine may include software being tested (i.e., the product under test) along with a simulated computing environment, including an operating system. The testing director 144 may assign different test types to different machines. For example, a first group of machines may do random walk testing, while a second group follows task sequences predicted by the pattern detector 140 to complete a task. A third group may perform pioneering exploration, which is directed to exploring previously unexplored, and thus unknown areas of the action space.

The test platform 130 includes an action telemetry interface 132, state telemetry interface 134, reward component 136, the user-interface collection component 138, the reinforcement-learning model 140, the action space mapper 142, and the testing director 144.

The action telemetry interface 132 receives action telemetry data 129 from the testing agent 127 running on the plurality of test machines (TM)s. The action telemetry data includes descriptions of actions (alternatively described simply as "actions") the various testing agents took on the test machines. Actions may include all possible interactive actions with the software interface. In other words, actions may be any action (e.g., select, hover, enter text) a user could perform with an interface element (e.g., button, menu, text box). In one aspect, the actions are determined through interrogation of an accessibility layer (e.g., the Microsoft UI Automation System). The accessibility layer or function framework may be used by applications, like screen readers, for low vision users. The number of available actions for each state may be dynamic. Some software applications have a very large action space. For example, some applications may have 100,000 or more actions. During testing, the identified actions may be stored in a database. In one aspect, the identified actions are stored in a multi-model database service, such as a key-value store.

The state telemetry interface 134 receives state telemetry data 128 from the product under test 126 (i.e., instance of software being tested). The state telemetry data can include new interface elements presented in response to the action along with other changes (e.g., content changes) made to the interface. The state telemetry data can also include system and software health information, such as whether the system crashed, hung, or the like. In some aspects, the state telemetry data may take the form of an image of the UI that resulted from an action. Taking an image of the UI is resource intensive and it may not be an efficient practice to collect an image for each test action. In aspects, UI images are collected during action replay when the pattern being replayed is associated with above a threshold confidence factor to conserve resources require to capture and store the UI images. In aspects, the confidence factor threshold could be above 0.7, above 0.8, and/or above 0.9. The confidence score indicates a confidence that the pattern is correctly identified by the pattern detector 140.

The reward component 136 evaluates a newly achieved state and assigns a reward. The reward may be associated with the state and the action that produced the state. A goal is to test functionality as users experience the functionality in applications and in an operating system shell. The reward function may be formulated differently in different experiments. In a first aspect, a positive reward is triggered if the action taken by the agent matches a target action (e.g., when the agent takes the actions of clicking the Bold button or clicking the Font button from the menu bar) or achieves a target state. The action and/or state and associated reward may be provided as training data.

The testing system may recognize when a sought after state is achieved by comparing a new state to a reward criteria. The reward criteria are defined to reflect the sought after result. In one example, the sought after states represent scenario completions, such as the completion of a task within the software being tested. A task may be, for example, taking a picture, entering text, bolding text, or any number of other possible tasks. Many of these tasks may require a sequence of multiple interactions. For example, a task may require opening a menu, selecting a menu item, providing input, and then selecting the enter button. In contrast, simply opening a menu interface and then closing the same interface, without additional interactions, may be an example of failing to complete a scenario. Again, the sought after state can be defined by a reward criteria and assigned a reward value when produced by the testing agent.

The user-interface collection component 138 collects images of user interfaces during training and/or testing. A new image may be captured after every action. The user-interface collection component 138 may normalize UI images, for example to 300×300 pixels.

The reinforcement-learning model 140 learns how to perform tasks in the software being tested and then performs the tasks as part of software testing. In aspects, the trained reinforcement-learning model 140 can perform tasks in different versions of the software that have different user interface elements than the version on which the model was trained.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features and actions may include interactions with user interface elements. These state, action, and reward concepts may be formally represented by the finite MDP for sequential decision making. An MDP is a tuple $<S, A, T, R, \gamma>$ where S is a finite set of states, A is a finite set of actions, T is a state transition function, R is a reward function and $\gamma$ is a discount factor.

The technology described herein includes a framework in which the test platform 130 interacts with a plurality of test machines (e.g., 30, 60, 100, 1000) simultaneously to collect trajectories. A trajectory is the sequence of contiguous actions taken through the action space by an agent. Each test machine has an operating system and a product under test (e.g., software version) 126 (e.g., MICROSOFT WORD) pre-installed along with a test agent 127. For example, the agent may open MICROSOFT WORD and start to interact with the MICROSOFT WORD interface. The technology described herein trains the agent to find an efficient path to achieve the target tasks. The agent observes the current state $s_t$ with the environment and receives the reward, and the interface of the application moves to the next state $s_{t+1}$. Each episode terminates when the agent achieves the target reward or reaches the maximum step.

The task-learning problem may be understood as a reinforcement-learning problem by using the Markov decision process. State $s_t$ is represented with the screenshot of the user interface. During each step, the agent observes the visual representation of the interface, and extracts the screenshot of the interface and uploads it to image storage for potential re-use of the data for future training. The use of a visual representation to define a UI state contrasts with using the status of various UI elements to define the UI state. Visual representations have several advantages over UI element representations. For example, visual representations need little or no prepossessing for use in a reinforcement-learning model. In aspects, the visual representation is combined with other information to define a state or task.

Actions include all possible interactive actions with the software interface. In other words, actions may include any action (e.g., select, hover, enter text) a user could perform with an interface element (e.g., button, menu, text box). In one aspect, the actions are determined through interrogation of an accessibility layer (e.g., the Microsoft UI Automation System). The accessibility layer or function framework may be used by applications, like screen readers, for low vision users. The number of available actions for each state is dynamic. Some software applications have a very large action space. For example, some applications may have 100,000 or more actions. During testing, the identified actions may be stored in a key-value store. This storage method may help facilitate use of a parametric action-space model for training the agent.

The transition function T describes the probability of transitioning to the next state $s_{t+1}$ given current state $s_t$. The transition function is determined by the system implemented in a test machine.

A goal is to test functionality as users experience the functionality in applications and in an operating system shell. The reward function may be formulated differently in different experiments. In a first aspect, a positive reward is triggered if the action taken by the agent matches a target action (e.g., when the agent takes the actions of clicking the Bold button or clicking the Font button from the menu).

A first step for training or running the reinforcement-learning model may be to generate a representation of the target task and/or a current state. The representation is then input to the reinforcement-learning model for the model to use to select an action. Different methods of generating a representation are possible, as described with reference to FIG. 4.

Figure 4:
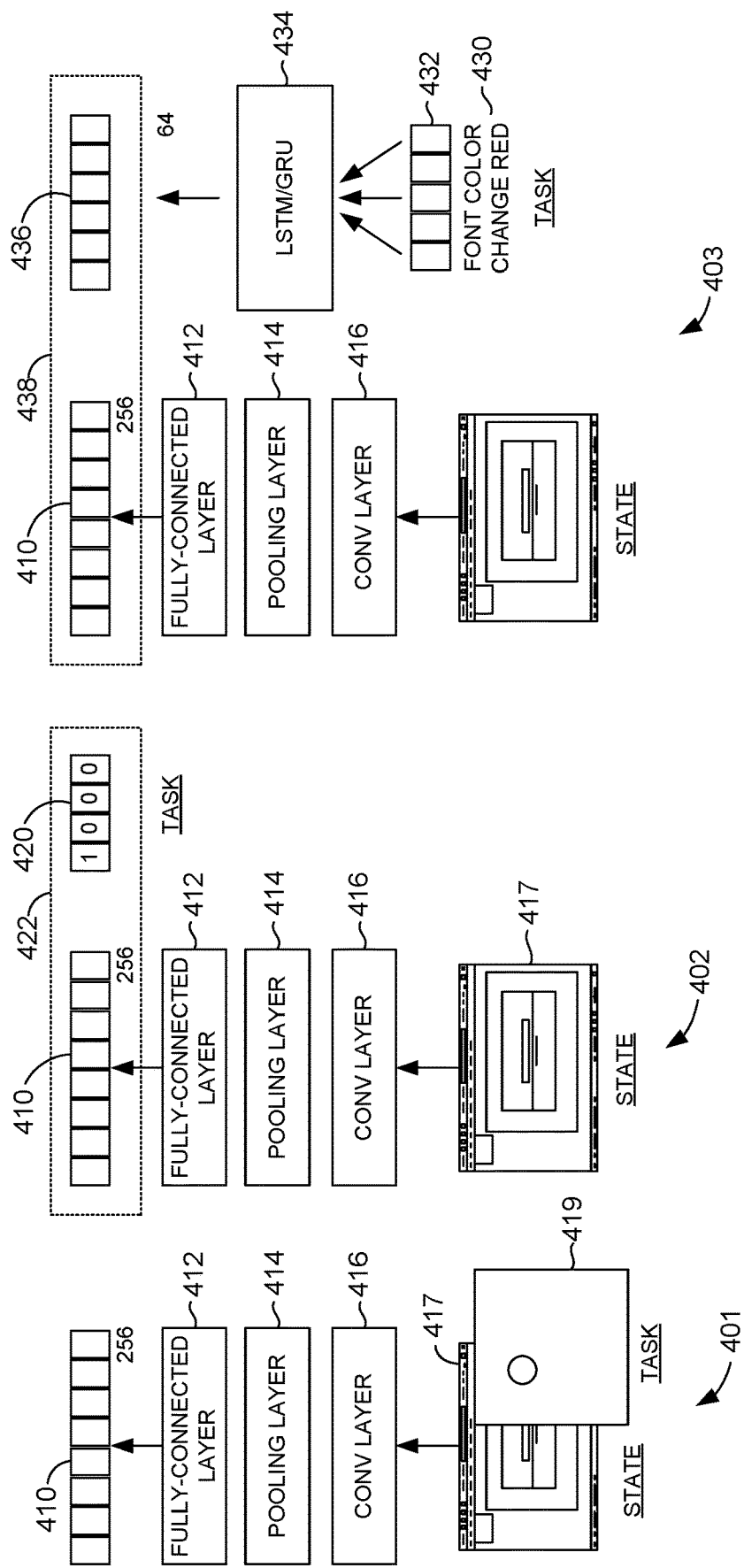
FIG. 4 is a block diagram illustrating different input encoding options, in accordance with aspects of the technology described herein.

Turning now to FIG. 4, methods of generating task representations are shown. Task representations represent the state associated with a system under test when a task is completed. In other words, the task representation can be a target state. The task representation can be used to determine when a reward should be associated with an action. Conceptually, a reward should be issued when a state produced matches the desired task representation. Each task representation starts with an image of the user interface as it appears after completing a task. In addition, a unique way to represent the specific task is included as input. The unique ways may include a mask image, a one-hot encoding, and/or a natural language task embedding. The unique ways to identify a task may be provided by person directing the reinforcement-learning model training.

The first method 401 of generating a task representation includes an image 417 of the user interface upon task completion along with a mask image 419 that highlights a portion of the user interface closely associated with completing the task. A person directing the training may provide the mask image with the highlighted portion. The image 417 and mask are provided to a convolutional layer 416, followed by a pooling layer 414, and then a fully connected layer 412, which generates the representation 410. The convolutional layer 416, pooling layer 414, and fully connected layer 412 may be trained as part of training a reinforced-learning model. The goal of the training is to cause the layers to emphasize features of the image that best represent the uniqueness of various states. Training of the network is described in more detail subsequently.

The second method 402 concatenates a representation of the UI image 417 with a one-hot encoder value to represent the task 422. One-hot encoding is used as a method to quantify categorical data. In short, this method produces a vector with a length equal to the number of categories in the data set. If a data point belongs to the nth category then components of this vector are assigned the value 0 except for the nth component, which may be assigned a value of 1. Thus, if the reinforcement-learning model is to be trained on four tasks, a first task may be labeled 1, 0, 0, 0, a second task 0, 1, 0, 0, a third task 0, 0, 1, 0, and a fourth task 0, 0, 0, 1. The one-hot encoder value will be unique for each task. The one-hot encoder value may be generated by a one-hot encoder algorithm.

The third method 403 concatenates a representation of the UI image 417 with a task embedding 436 to represent the task 438. A natural language description 430 of the task is encoded 432 and provided to a language model 434, such as a Long Short Term Memory (LSTM) and Gated Recurrent Unit (GRU) model. The language model 434 generates a task embedding 436 of the natural language description. Similar descriptions should receive similar embedding with similar values because the embedding may be based on a language space where words and phrases with similar meaning may be associated with nearby values. The natural language representation is then concatenated with the image representation 410 to form a task representation 438.

Figure 5:
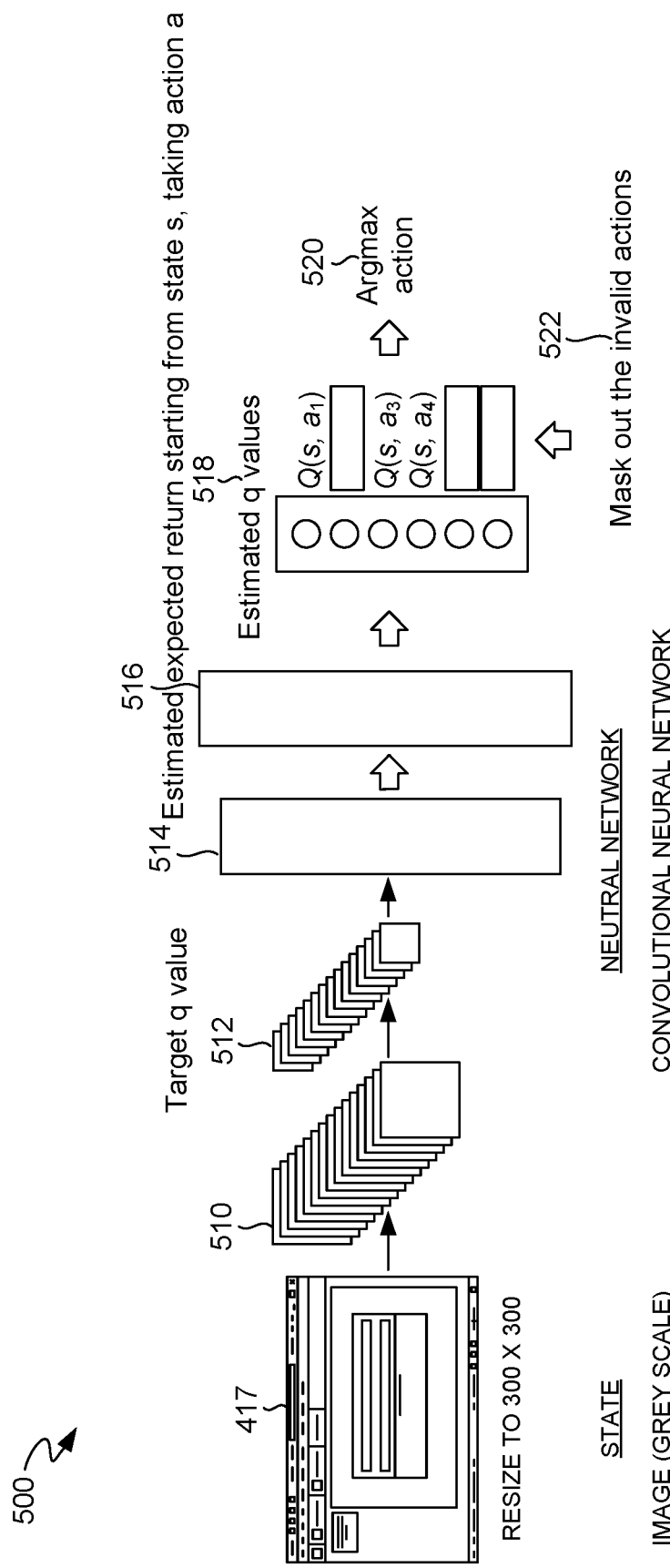
FIG. 5 is a block diagram illustrating a DQN reinforcement-learning model, in accordance with aspects of the technology described herein.

Different architectures can be used with the reinforcement-learning model 140, including a deep Q network (DQN) and a proximal policy optimization (PPO). The DQN model 500 is illustrated in FIG. 5. The DQN model 500 may receive an image 417 of the user interface as input. The image 417 represents the current state of the UI. The image 417 may be fed to a convolutional layer 510 and pooling layer 512 to generate an image representation. The image representation may be processed by a convolutional layer 514. In aspects, the convolutional neural network 514 is trained to identify meaningful user interface features. Meaningful user interface features tend to be uniquely associated with an interface element. For example, if all user interfaces have a blue bar across the top, then the blue bar would not be meaningful. On the other hand, features (e.g., square shape, icon design) of a button or other interactive element can help distinguish one interface from another interface and elements within the interface from other elements within the interface. In one aspect, the convolutional neural network 514 is not updated during training of the reinforcement-learning model. The output layers 516 assign a Q-value to various action state pairs 518. The Q-value is the estimated optimal value of taking the action from the given state. The action with the largest Q value may be selected 520. In other implementations, an action is selected from the top N Q values. This approach adds exploration data by selecting an action that current training suggests is not optimal. If the action determined to be not optimal turns out to be optimal, then the action and associated reward can form valuable training data. The training may occur in batches, through a replay process. In examples, the training observes the reward actually received versus the predicted reward and adjusts network values. The predicted reward may correlate to the Q-value. In aspects, invalid actions 522 may be eliminated before selecting the action based on the Q-value. Invalid actions 522 may be masked. Invalid actions 522 may correspond to actions that are not available in the present user interface.

Figure 6:
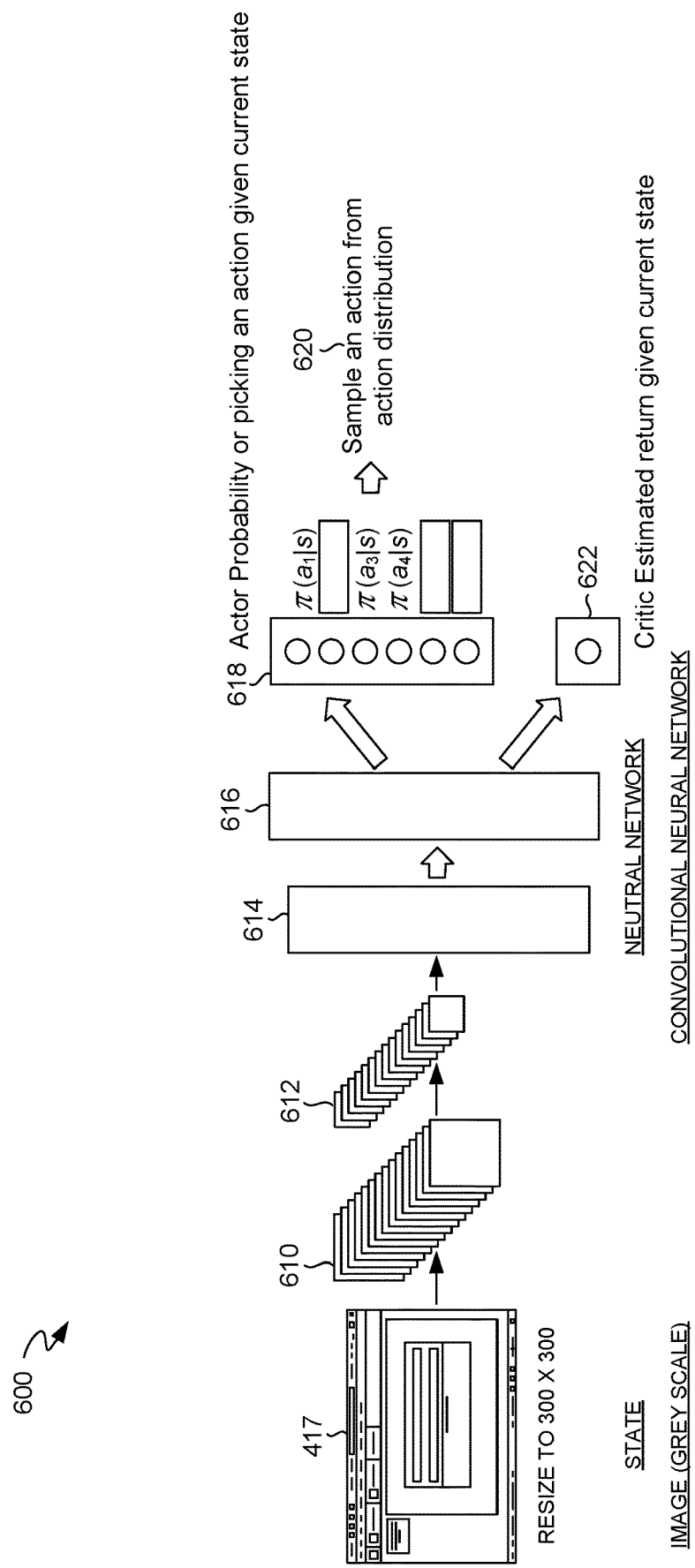
FIG. 6 is a block diagram illustrating a PPO reinforcement-learning model, in accordance with aspects of the technology described herein.

The PPO model 600 is illustrated in FIG. 6. The PPO model 600 may receive an image 417 of the user interface as input. The image 417 represents the current state of the UI. The image 417 may be fed to a convolutional layer 610 and pooling layer 612 to generate an image representation. The image representation may be processed by a convolutional layer 614. In aspects, the convolutional neural network 614 is trained to identify meaningful user interface features. In one aspect, the convolutional neural network 614 is not updated during training of the reinforcement-learning model. The output layers 616 may comprise a critic portion and an actor portion. The actor portion outputs various actions, while the critic calculates an estimated reward. Both receive the same input from the convolutional neural network 614.

A PPO uses policies to select an optimal action. A policy is a mapping from action space to state space. The policy may include instructions for the testing agent 127 to a take an available action from a given state. A goal of training the reinforcement model is to optimize the policy. In aspects, the reinforcement model may take several actions and then perform training on a batch of actions. The actions taken, the estimated reward, and the actual reward may form the training data.

In the UI testing context, the state is a UI, in some examples defined by an image of the UI, and the available actions are those available in the UI. The actor network receives UI images (state data) as the input and outputs a list of probabilities 618, with one probability per action. These probabilities form a distribution, and the action can then be chosen by sampling 620 from this distribution.

To represent the state value function, the critic network also receives the state as the input and outputs a single number representing the estimated state value 622 of that state. The job of the critic model is to learn to evaluate if the action taken by the actor led a better state or not and give its feedback to the actor. The critic outputs a real number indicating a rating (Q-value) of the action taken in the previous state. By comparing this rating obtained from the critic, the actor can compare its current policy with a new policy and decide how it wants to improve itself to take better actions.

The convolutional neural network (CNN) 616 may be modified to include task information in the model through the different task representations described with reference to FIG. 4. With the image encoder representation (method 401), the image encoder may be shaped identically with the screenshot image and concatenated to the screenshot image (e.g., 300×300×1 to 300×300×2) to feed into the CNN 616 without updating the model architecture. With the one-hot ID representation, an array of the one hot representations may be concatenated with the output of the last second layer of the CNN 616 and provided to an additional fully connected layer added prior to the last softmax layer. For the task embedding representation, the one-hot representation of a sequence of words to represent each task may be input, followed by an embedding layer and a GRU layer. The output of the GRU layer may be concatenated with the output of the last second layer of the CNN 616 with another fully connected layer.

The embedding of task and the CNN may be jointly trained. Since there are varying numbers of available actions per state, action masking may be used to provide normalization. In the actor network, a mask may be added to actions that are not interactive for the current state. In one aspect, the available actions in a user interface may be represented by a vector or other data structure. The vector may have enough dimensions to represent all user interface elements in a user interface having the most elements. For example, if the most elements in a user interface is 95, then a vector with 100 dimensions may be used. If another interface includes 20 user interface elements, then the other 80 available dimensions in the vector may be masked.

Returning to FIG. 1, the reinforcement-learning model 140 may be trained through curriculum learning methods. Curriculum learning may be used for software testing as an alternative to or in conjunction with PPO. Curriculum learning (CL) is a learning strategy that learns from easier data then progresses to harder data. The technology described herein may use a naive version of curriculum learning reinforcement learning with the following logic: A number of tasks n may be set up and ordered from easy tasks to a harder task. A list of target rewards may be initialized for each task. The agent may be trained to achieve task 0, which is the easiest task. If the agent completed this task with mean episode reward greater than or equal to the target reward for this task, then the agent is set to train the next task. For example, an easy task may require two consecutive actions to complete. A harder task may require more than two consecutive actions to complete.

The curriculum learning may increase the overall training efficiency. Learning a complex task can be challenging because the rewards will be sparse and the agent will need to take a large number of actions before receiving a positive reward. In contrast, learning an easy task should require performance of fewer actions. Once the reinforcement-learning model has learned an easy task, it may be able to leverage the training received to select better actions while attempting to learn the more complex task. The better actions may mean fewer overall actions are required to learn the more difficult task. Performing fewer actions to achieve the same training is more efficient.

The reinforcement-learning model 140 may be trained to perform tasks. In one aspect, a plurality of workers are used to collect trajectories and one GPU is used for model training. The workers may run on test machines that are separate from the GPU machine. A batch size of 192 may be used in one non-limiting example. The batch includes a series of actions, resulting states, resulting rewards, and estimated rewards. A scheduled decay-learning rate (starting at 1e-4) may be used to train the model. In one aspect, each UI images may be reshaped to 336×336 and grayed out for normalization. To balance exploration and exploitation of PPO, an entropy coefficient scheduler may be used starting at 0.005.

The reinforcement-learning model 140 may be trained to perform multiple tasks. In an example scenario, the agent may be trained to target four tasks in parallel with the three previously described task representation methods. All four tasks may be learned simultaneously when training with the multitask PPO and image encoder representation and task embedding. For one hot task id representation (method 402), the learning may start slower, but catch up to the other methods quickly. Augmenting the RL with the curriculum learning may facilitate learning of more complex tasks, such as entering text and then changing the font color.

The action space mapper 142 uses the action telemetry data and state telemetry data to understand the action space. The technology described herein may start with an undefined action space but begins to learn about the action space through exploration, which is part of the reinforcement learning process. The reinforcement learning process attempts to learn the most efficient procedure for performing a task, but in the learning process the action space is explored. The exploration occurs each time the reinforcement learning process selects a new action to attempt. Whether the action helps complete the task or not, taking the action helps the testing system understand the action space. The exploration may be performed by a plurality of test machines running instances of the software being tested. Each test machine may include a testing agent that performs actions on the software being tested. The testing agent may receive information about the current state of the software as actions are taken during the learning process. In one aspect, the state information is provided by an accessibility function built into the software and/or the operating system running on the test machine. In another aspect, the state information is learned through analysis of an image of the UI. The current state of the software includes user interface elements that can be interacted with from the current state. The current state can also include the type of interaction each component can receive.

The reinforcement-learning model selects an interface element to interact with and, if multiple interaction types are possible, selects an interaction type. The selection is based on the training received. The selected interaction type is then implemented on the selected interface element to change the state of the software being tested. Both the action taken and the resulting state are communicated to a centralized testing service. The action taken can be described herein in action telemetry data, while the resulting state can be described in state telemetry data. The centralized testing service may then begin to build a model of the action space using the action telemetry data and state telemetry data. The model of the action states can be built by combining telemetry data received from the plurality of test machines conducting the testing.

The testing director 144 may cause various reinforcement models to perform tasks the models have been trained to learn. In one aspect, a single model can learn multiple tasks. A group of reinforcement models may be used to perform a large group of tasks. The health of the system may be evaluated during performance of the learned tasks. Any unhealthy conditions encountered during task performance may be flagged for investigation and debugging. The testing director 144 may track unhealthy conditions and output these to developers along with the task and/or action step associated with the unhealthy condition.

The testing director 144 may also assign a portion of the testing machines to learn new tasks through reinforcement learning. The learning process can double as a type of exploration of the model space.

The testing director 144 assigns a testing task to various machines. In addition to the reinforcement learning training and task performance by the reinforcement learning models, other types of testing may be performed. In aspects, the testing types may be assigned for a time duration, such as an hour, and then a new testing task may be assigned. The testing on the test machines may be split into different modes. A portion of machines may be allocated to continue random testing, which serves an exploration function. As used herein, random testing can include directed and undirected random testing (e.g., "feedback-directed random test generation" and "adaptive random testing") A second portion of the machines may be allocated to replay testing, which seeks to replay previously identified action scenarios that produce the sought after state. A third portion of machines may be allocated to pioneer testing. Pioneer testing performs random actions, except that the random actions are directed to an undefined portion of the action space. For example, an available user interface element that has not previously been interacted with through the random testing may be selected as a starting point for pioneer testing. Pioneer testing helps ensure coverage for all aspects of a software being tested. In other examples, other types of algorithmic testing and exploration may be used.

Various rules may be used to direct testing resources to different testing modes or different areas of the software. The testing director 144 may evaluate the reward outcome from the past testing and reduce the runtime in the interface areas with no or few unique rewards in the past. This feature saves test machine capacity. The testing director 144 may evaluate rewards specific to the branch under test and tries to focus the capacity to reproduce the rewards specific to that branch. In one aspect, as the number of rewards hit during random exploration decreases, the amount of resources allocated to random exploration are reduced. Similarly, as fewer new action spaces are discovered, the amount of resources allocated to pioneering and/or random exploration are reduced.

The technology described herein utilizes the learned system space to navigate the system effectively while attempting the rewards. The telemetry from the attempts is used to re-evaluate the models and retrain the technology described herein. The technology described herein starts with random exploration and once it learns how to achieve rewards, it optimizes to focus the capacity around hitting rewards.

Figure 2:
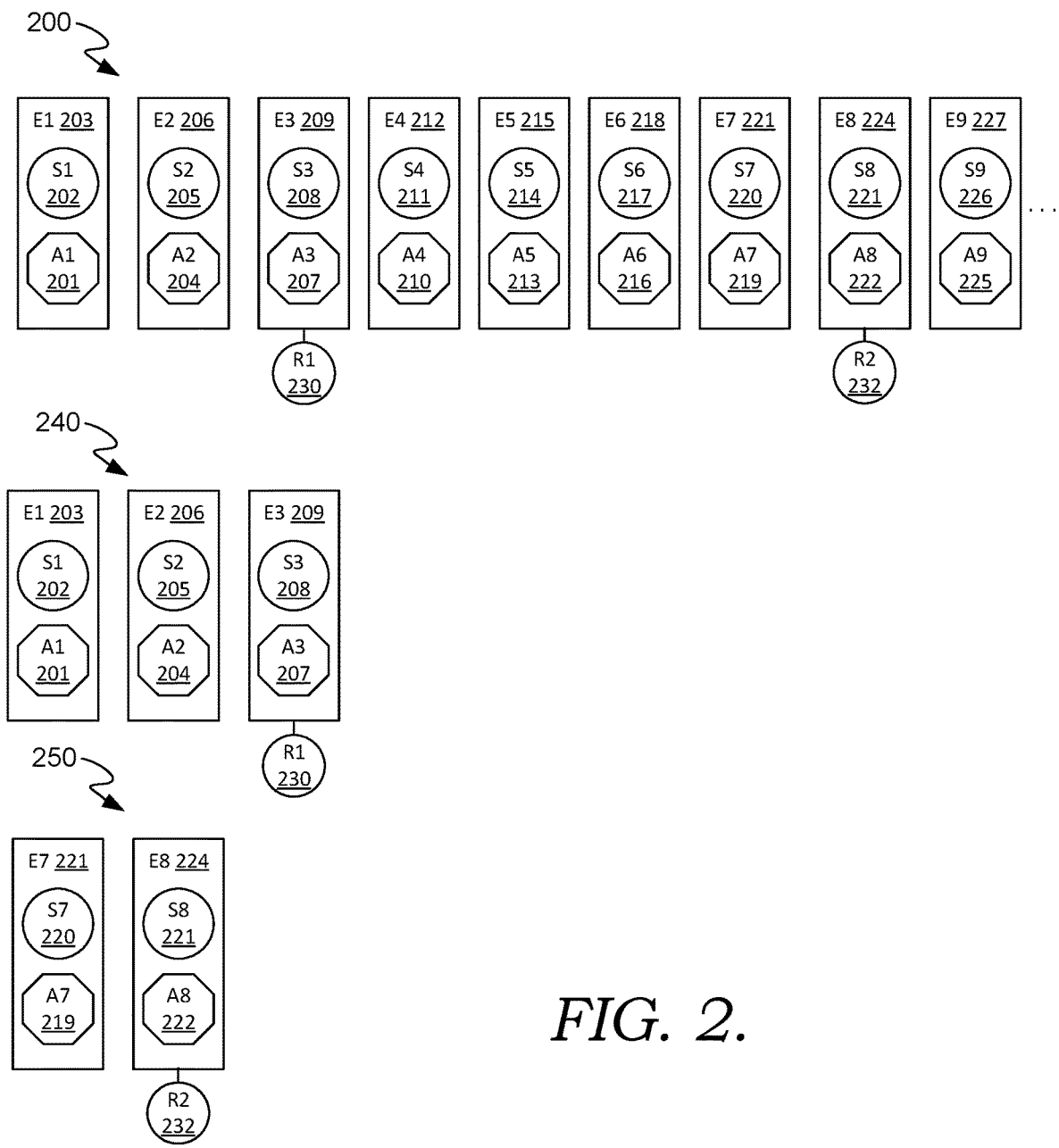
FIG. 2 is a diagram illustrating pattern identification in an event sequence, in accordance with aspects of the technology described herein.

Turning now to FIG. 2, the sequence of events leading to performance of a task and assignment of rewards is illustrated, according to aspects of the technology described herein. As described previously, the test platform 130 of FIG. 1 receives a plurality of action telemetry data and corresponding state telemetry data, which may be an image of the resulting UI. A specific action produces a specific resulting state to form an event. The resulting state is the state of the software being tested directly after the action is taken and before a subsequent action is taken. The state can be defined by an image of the UI. In other aspects, the state is also defined by a collection of software and/or system attributes and corresponding values.

FIG. 2 shows an event sequence 200. The event sequence includes a first event 203, a second event 206, a third event 209, a fourth event 212, a fifth event 215, a sixth event 218, a seventh event 221, an eighth event 224, and a ninth event 227. These nine events may be just nine of hundreds, thousands, or more events recorded during testing.

The first event 203 includes a first action 201 and a first state 202. The first state 201 is the state produced by performing the first action 201. For example, if the first action 201 is selecting a save icon, then the first state 202 could include a displayed "save interface" that was not displayed in the previous state. The second event 206 includes a second action 204 and a second state 205. The third event 209 includes a third action 207 and a third state 208. The third event 209 is also associated with a first reward 230. In aspects, a reward may be assigned to each state with a higher reward associated with sought after state states. In other aspects, a reward is only assigned when a state matches completion of a targeted task within the application, such as saving a file, taking a picture, or any other defined task that may be of particular interest to testers.

The fourth event 212 includes a fourth action 210 and a fourth state 211. The fifth event 215 includes a fifth action 213 and a fifth state 214. The sixth event 218 includes a sixth action 216 and a sixth state 217. The seventh event 221 includes a seventh action 219 a seventh state 220. The eighth event 224 includes an eighth action 222 and an eighth state 221. The eighth event 224 is associated with a second reward 232. The second reward 232 indicates that the eighth state 221 is a sought after state. The ninth event 227 includes a ninth action 225 ninth state 226.

The goal of reinforcement learning is to understand which actions are required to achieve a target state. In this example, a first detected pattern 240 includes the first event 203, the second event 206, and the third event 209. The last event in the detected pattern should be associated with a reward indicating the achievement of a sought after state. A challenge in detecting a sequence of actions that produces the sought after state lies in determining which action starts the sequence. The first detected pattern 240 includes three events, but note the second detected pattern 250 only includes two events and that the fourth event 212, the fifth event 215, and the sixth event 218 were determined to be unrelated to producing the eighth state 221. Instead, only the seventh action 219 and in the eighth action 222 were determined to be required to produce the eighth state 221. The three excluded events (i.e., the fourth through sixth events) may be the result of the testing program pursuing what turned out to be a tangent that did not produce the sought after result. Through training, the reinforcement-learning model learns to only perform the seventh action 219 and in the eighth action 222 when attempting to complete the task associated with the eighth action 222.

Figure 3:
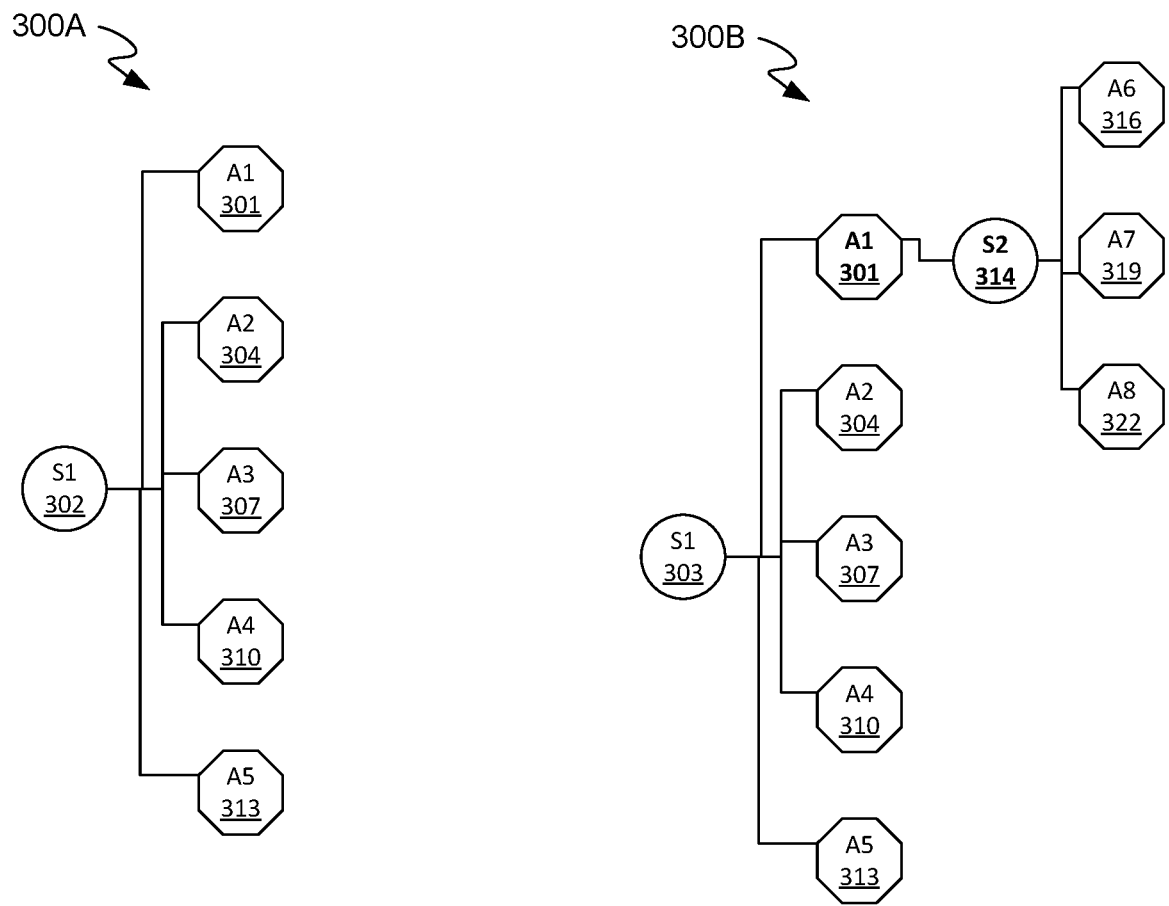
FIG. 3 is a diagram illustrating an undefined action space, in accordance with aspects of the technology described herein.

Turning now to FIG. 3, an undefined action space is illustrated, according to aspects of the technology described herein. The action space is a collection of actions that can be taken from different user interface states available in a software being tested. In a defined action space, all available actions and the resulting states produced by taking the available actions are provided. In undefined space, the actions available from a given state may be determined, but the state produced by taking the actions is unknown.

The action space 300A illustrates an undefined action space. The action space 300A includes a first state 302. The first state 302 to a user interface through which five different actions are possible. These actions include the first action 301, a second action 304, a third action 307, a fourth action 310, and a fifth action 313. Note that the resulting state produced by taking any of these five actions is unknown.

The action space 300B illustrates what happens when the first action 301 is taken. In response to taking the first action 301, a second state 314 is produced. Three additional actions can be taken from the second state 314. These three additional actions include a sixth action 316, seventh action 319, and an eighth action 322. As actions are taken, the technology described herein may build a map of the action space. This is part of the learning process. The action space can be used subsequently during testing to run various scenarios.

Figure 7:
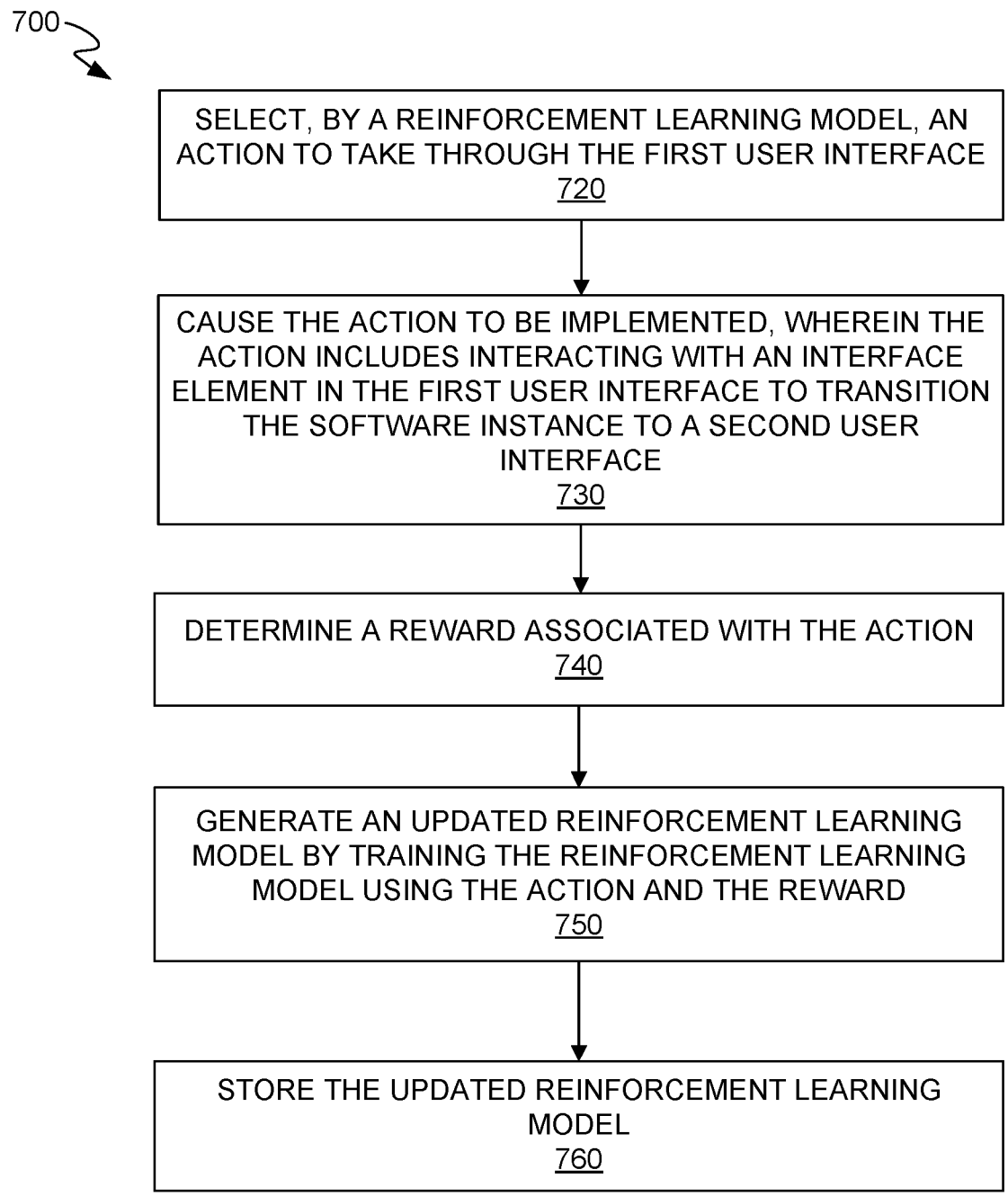
FIG. 7 is a flow chart illustrating a software testing method, in accordance with aspects of the technology described herein.
Figure 8:
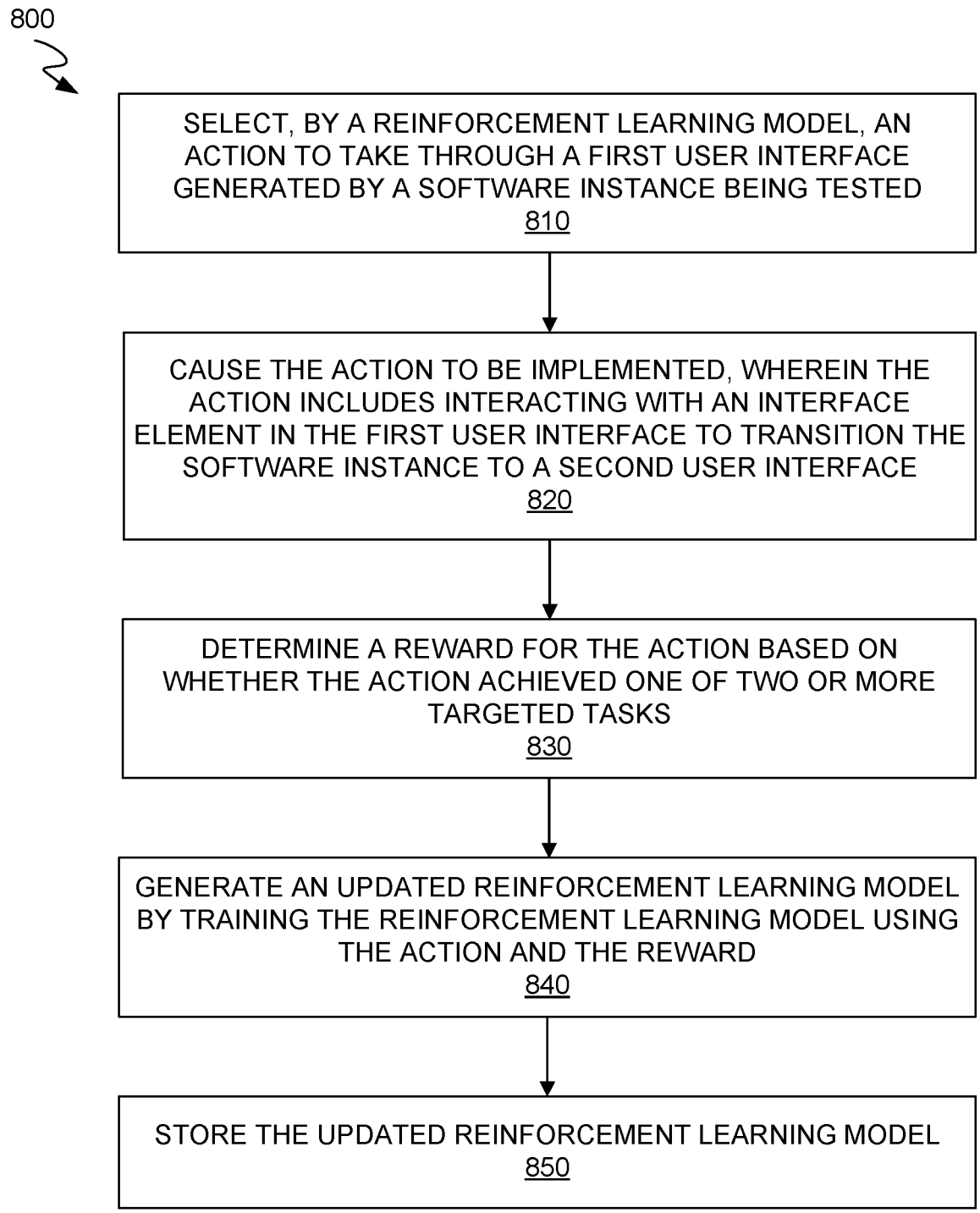
FIG. 8 is a flow chart illustrating a software testing method, in accordance with aspects of the technology described herein.
Figure 9:
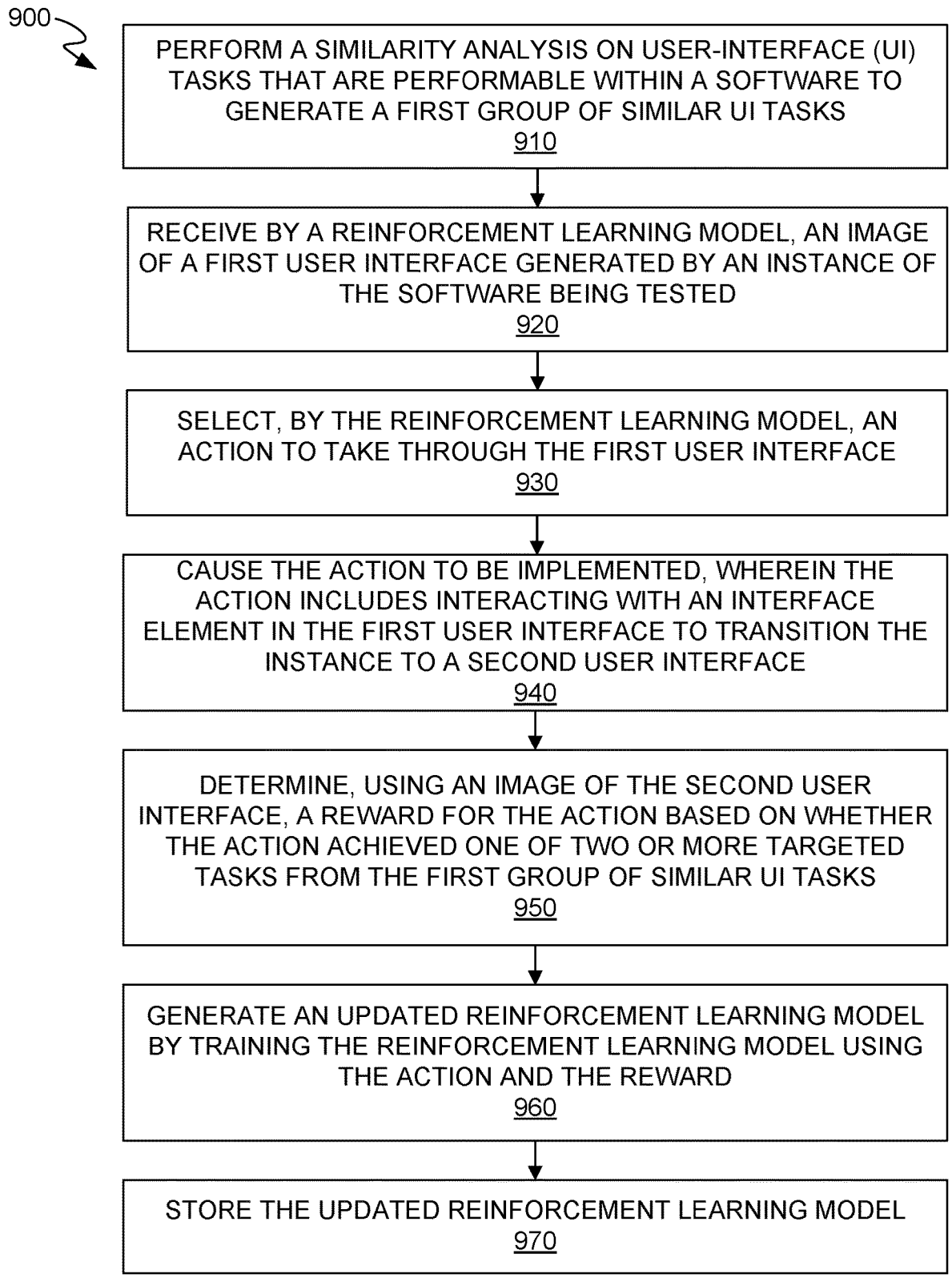
FIG. 9 is a flow chart illustrating a software testing method, in accordance with aspects of the technology described herein.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be performed by a standalone application, a service or hosted service (standalone or in combination with another hosted service), to name a few. In addition, methods 700, 800, and 900 are described, by way of example, with respect to FIGS. 1-6. However, these methods may additionally or alternatively be executed by any one system, or any combination of systems, including, but not limited to, those described herein.

FIG. 7 describes a method 700 of learning to complete tasks with reinforcement learning, according to an aspect of the technology described herein. Once tasks are learned, the tasks can be completed in a software testing process to determine whether performance of the tasks produces an unhealthy condition in the software and/or system being tested.

Initially, an agent on a test machine may open a software instance being tested to a first user interface. The testing director 144 may specify the user interface to open. In aspects, the first user interface may be a default opening page for the software. For example, using MICROSOFT WORD as an example, the first interface may be the "Home" tab. In other aspects, the first user interface may be selected for testing a specific interface within a software instance. For example, again using MICROSOFT WORD as an example, the first interface may be the "Review" tab.

In aspects, an image of the first user interface may be received by a reinforcement-learning model as an input used to select an action to be taken through the user interface. In aspects, state telemetry data for the first user interface may also be received.

At step 720, the method 700 includes selecting, by a reinforcement-learning model, an action to take through the first user interface. The action selected may be the action estimated to produce the highest reward (e.g., Q value). In other aspects, an exploration function causes the system to select an action with a lower estimated reward. For example, an action may be randomly selected from the actions with the top five estimated rewards. Actions may include all possible interactive actions with the software interface. In other words, actions may be any action (e.g., select, hover, enter text) a user could perform with an interface element (e.g., button, menu, text box).

In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 730, the method 700 includes causing the action to be implemented. Causing the action to be implemented can include communicating an instruction to a testing agent on a test machine. The testing agent can then provide instructions to the software instance being tested. The action may include interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

In aspects, state telemetry data describing states of the first version of the software at points in time during testing may be received after an action is taken. The state telemetry data may be received from the product under test (i.e., instance of software being tested) on various TMs. The state telemetry data can include new interface elements presented in response to the action along with other changes (e.g., content changes) made to the interface. The state telemetry data can also include system and software health information, such as whether the system crashed, hung, or the like. In aspects, the state telemetry data may take the form of an image of the UI that resulted from an action.

At step 740, the method 700 includes determining a reward associated with the action. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 750, the method 700 includes generating an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture.

At step 760, the method 700 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

FIG. 8 describes a method 800 of learning to complete multiple tasks with reinforcement learning, according to an aspect of the technology described herein. Once tasks are learned, the tasks can be completed in a software testing process to determine whether performance of the tasks produces an unhealthy condition in the software and/or system being tested.

At step 810, the method 800 will select, by a reinforcement-learning model, an action to be taken a first user interface generated by a software instance being tested. The action selected may be the action estimated to produce the highest reward (e.g., Q value). In other aspects, an exploration function causes the system to select an action with a lower estimated reward. For example, an action may be randomly selected from the actions with the top five estimated rewards.

The first user interface may be a default-opening page for the software. For example, using MICROSOFT WORD as an example, the first interface may be the "Home" tab. In other aspects, the first user interface may be selected for testing a specific area of a software instance. For example, again using MICROSOFT WORD as an example, the first interface may be the "Review" tab.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 820, the method 800 will cause the action to be implemented. Causing the action to be implemented can include the testing director 144 communicating an instruction to a testing agent on a test machine. The testing agent can then provide instructions to the software instance being tested. The action includes interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 830, the method 800 will determine a reward for the action based on whether the action achieved one of two or more targeted tasks. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 840, the method 800 will generate an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture. In an aspect, the reinforcement-learning model is trained on multiple tasks. In one aspect, the training is a serial process where a first task is trained, then a second task, and so on. In aspects, the first task may be the easiest to learn and the last task the most complex. The complexity may be measured in an amount of sequential actions need to complete the task.

At step 850, the method 800 will store the updated reinforcement-learning model. In aspects, the stored reinforcement-learning model then makes additional interaction choices and the agent may cause the interactions to be implemented. The reinforcement-learning model receives additional training in response to rewards associated with the additional interactions. Eventually, the reinforcement-learning model may learn to complete one or more tasks. Once learned, the reinforcement-learning model can be used to test a software instance by completing the learned tasks and looking for unhealthy system or software conditions during completion.

FIG. 9 describes a method 900 of testing software, according to an aspect of the technology described herein. Once tasks are learned, the tasks can be completed in a software testing process to determine whether performance of the tasks produces an unhealthy condition in the software and/or system being tested.

At step 910, the method 900 includes performing a similarity analysis on UI tasks that are performable within a software to generate a first group of similar UI tasks. The technology described herein may train a reinforcement-learning model to perform multiple tasks. When training a reinforcement-learning model on multiple tasks, performance may be enhanced by training the model to perform similar tasks. Similar tasks may have one or more common steps. For example, tasks performed from the same menu may include opening the menu.

There are multiple ways to determine similarity. For example, the image of the interface upon achieving a target state may be compared to images of the interface upon achieving a different target state. Visual similarity methods may be used to measure the difference between images. These methods include root mean square error (RMSE), peak signal-to-noise ratio (PSNR), structural similarity index (SSIM), and feature-based similarity index (FSIM).

Similarity may be determined using the one hot encoding, described previously. In another aspect, language encoding of a task description is used to determine similarity. In this method, "change font color to red" should be similar to "change font color to blue."

At step 920, the method 900 includes receiving, by a reinforcement-learning model, an image of a first user interface generated by an instance of the software being tested. In aspects, state telemetry data for the first user interface may also be provided.

At step 930, the method 900 includes selecting, by the reinforcement-learning model, an action to take through the first user interface. The action selected may be the action estimated to produce the highest reward (e.g., Q value). In other aspects, an exploration function causes the system to select an action with a lower estimated reward. For example, an action may be randomly selected from the actions with the top five estimated rewards.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 940, the method 900 includes causing the action to be implemented. Causing the action to be implemented can include communicating an instruction to a testing agent on a test machine. The testing agent can then provide instructions to the software instance being tested. Where the action includes interacting with an interface element in the first user interface to transition the instance to a second user interface. When the action is taken, action telemetry data describing the action may be provided to a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 950, the method 900 includes determining, using an image of the second user interface, a reward for the action based on whether the action achieved one of two or more targeted tasks from the first group of similar UI tasks. In this case, the reward is based on whether one of several different tasks was achieved. In this way, multiple actions and resulting states could receive a reward. In an aspect, completion of each task is associated with a reward.

At step 960, the method 900 includes generating an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture.

At step 970, the method 900 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

Example Distributed Computing Environment

Figure 10:
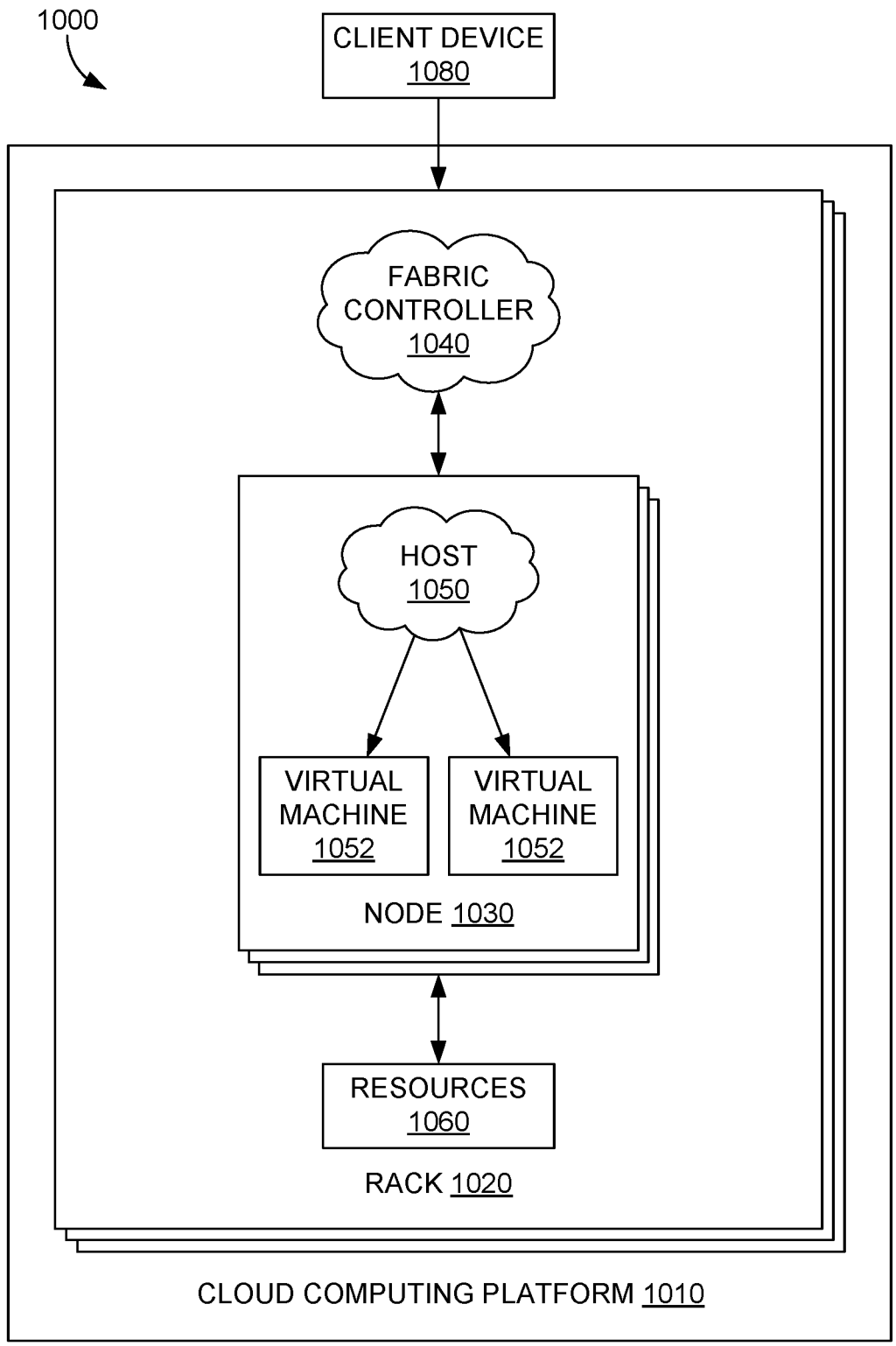
FIG. 10 is a block diagram of an example distributed computing environment suitable for use in implementing aspects of the technology described herein.

Referring now to FIG. 10, FIG. 10 illustrates an example distributed computing environment 1000 in which implementations of the present disclosure may be employed. Data centers can support distributed computing environment 1000 that includes cloud computing platform 1010, rack 1020, and node 1030 (e.g., computing devices, processing units, or blades) in rack 1020. The system can be implemented with cloud computing platform 1010 that runs cloud services across different data centers and geographic regions. Cloud computing platform 1010 can implement fabric controller 1040 component for provisioning and managing resource allocation, deployment, upgrade, and management of cloud services. Typically, cloud-computing platform 1010 acts to store data or run service applications in a distributed manner. Cloud computing infrastructure 1010 in a data center can be configured to host and support operation of endpoints of a particular service application. Cloud computing infrastructure 1010 may be a public cloud, a private cloud, or a dedicated cloud.

Node 1030 can be provisioned with host 1050 (e.g., operating system or runtime environment) running a defined software stack on node 1030. Node 1030 can also be configured to perform specialized functionality (e.g., compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1030, nodes 1030 may be partitioned into test machines (e.g., test machine 1052 and test machine 1054). Physical machines can also concurrently run separate service applications. The test machines or physical machines can be configured as individualized computing environments that are supported by resources 1060 (e.g., hardware resources and software resources) in cloud computing platform 1010. It is contemplated that resources can be configured for specific service applications. Further, each service application may be divided into functional portions such that each functional portion is able to run on a separate test machine. In cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in cloud computing platform 1010. Client device 1080 may be any type of computing device, which may correspond to computing device 1000 described with reference to FIG. 10, for example. Client device 1080 can be configured to issue commands to cloud computing platform 1010. In embodiments, client device 1080 may communicate with service applications through a virtual Internet Protocol (IP) and load balancer or other means that direct communication requests to designated endpoints in cloud computing platform 1010. The components of cloud computing platform 1010 may communicate with each other over a network (not shown), which may include, without limitation, one or more local area networks (LANs) and/or wide area networks (WANs).

Example Computing Environment

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 11:
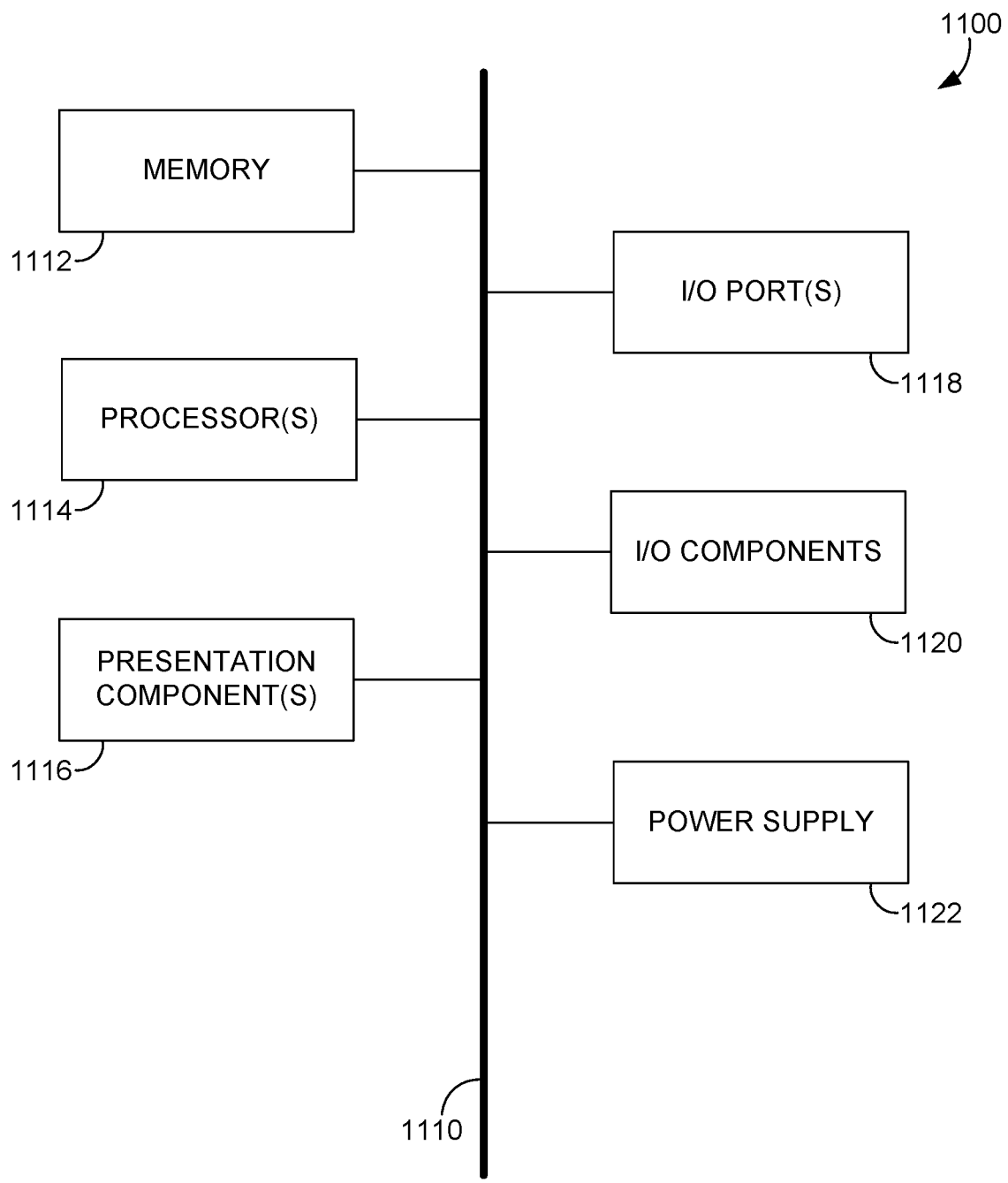
FIG. 11 is a block diagram of an example computing environment suitable for use in implementing aspects of the technology described herein.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the testing environment can include an API library that includes specifications for routines, data structures, object classes, and variables may support the interaction between the hardware architecture of the device and the software framework of the testing environment. These APIs include configuration specifications for the testing environment such that the different components therein can communicate with each other in the testing environment, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the testing environment and the schematics described herein, it is understood that the techniques described may be extended to other implementation contexts.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method of automated software testing comprising:
    selecting, by a reinforcement-learning model, an action to be taken in a first user interface of a software instance being tested,
    wherein the first user interface includes a first plurality of interactive elements;
    causing the action to be performed, wherein the action includes interacting with an interface element in the first user interface and performance of the action causes the software instance to change states from the first user interface to a second user interface,
    wherein the second user interface includes an interactive element different from the first plurality of interactive elements;
    determining a reward associated with the action;
    inputting an embedding of a natural language description of a state associated with the first user interface into the reinforcement-learning model;
    generating an updated reinforcement-learning model by training the reinforcement learning model using the action, the embedding, and the reward; and
    storing the updated reinforcement learning model.

2. The method of claim 1, wherein the method further comprises inputting an image of the first user interface to the reinforcement-learning model.

3. The method of claim 1, wherein the method further comprises inputting an image of the first user interface and a one hot encoding of a state associated with the first user interface into the reinforcement-learning model.

4. The method of claim 1, wherein the method further comprises inputting an image of the first user interface.

5. The method of claim 1, wherein the software instance is running on a first computing device and the reinforcement-learning model is running on a second computing device.

6. The method of claim 5, wherein the method further comprises monitoring health telemetry received from the first computing device to detect a bug in the software instance being tested.

7. The method of claim 1, wherein a first state associated with the first user interface is known and a second state associated with the second user interface is unknown.

8. A computer system comprising:
    a processor; and
    memory configured to provide computer program instructions to the processor, the computer program instructions including a software-testing tool configured to:
    select, by a reinforcement-learning model, an action to be taken in a first user interface generated by a software instance being tested,
        wherein the first user interface includes a first plurality of interactive elements;
    cause the action to be performed, wherein the action includes interacting with an interface element in the first user interface and performance of the action causes the software instance to change states from the first user interface to a second user interface,
        wherein the second user interface includes an interactive element different from the first plurality of interactive elements;
    determine a reward for the action based on whether the action achieved one of two or more targeted tasks;
    inputting an embedding of a natural language description of a state associated with the first user interface into the reinforcement-learning model;
    generate an updated reinforcement-learning model by training the reinforcement learning model using the action, the embedding, and the reward; and
    store the updated reinforcement-learning model.

9. The computer system of claim 8, wherein the software-testing tool is further configured to perform a similarity evaluation to determine the two or more tasks.

10. The computer system of claim 8, wherein the software-testing tool is further configured to input an image of the first user interface.

11. The computer system of claim 8, wherein the software-testing tool is further configured to input an image of the first user interface and a one hot encoding of a state associated with the first user interface into the reinforcement learning model.

12. The computer system of claim 8, wherein the software-testing tool is further configured to input an image of the first user interface to the reinforcement-learning model.

13. The computer system of claim 8, wherein the software instance is running on a first computing device and the reinforcement-learning model is running on a second computing device.

14. The computer system of claim 13, wherein the software-testing tool is further configured to monitor health telemetry received from the first computing device to detect a bug in the software instance being tested.

15. The computer system of claim 8, wherein the reinforcement-learning model is a proximal policy optimization model.

16. A computer storage medium storing computer-useable instructions that, when used by a computing device, cause the computing device to perform operations comprising:
  performing a similarity analysis on user-interface (UI) tasks that are performable within a software to generate a first group of similar UI tasks;
  receiving, by a reinforcement-learning model, an image of a first user interface generated by an instance of the software being tested,
  wherein the first user interface includes a first plurality of interactive elements;
  inputting an embedding of a natural language description of a state associated with the first user interface into the reinforcement-learning model as a task representation;
  selecting, by the reinforcement-learning model, an action to be taken in the first user interface;
  causing the action to be implemented in the instance of the software being tested, wherein the action includes interacting with an interface element in the first user interface and performance of the action causes the software instance change to a second user interface,
  wherein the second user interface includes an interactive element different from the first plurality of interactive elements;
  determining, using an image of the second user interface and the task representation, a reward for the action based on whether the action achieved one of two or more targeted tasks from the first group of similar UI tasks;
  generating an updated reinforcement-learning model by training the reinforcement learning model using the action and the reward; and
  storing the updated reinforcement-learning model.

17. The computer storage medium of claim 16, wherein the operations further comprise inputting a one hot encoding of a state associated with the first user interface into the reinforcement learning model.

18. The computer storage medium of claim 16, wherein the reinforcement-learning model includes a convolutional layer.

19. The computer storage medium of claim 16, wherein the instance is running on a first computing device and the reinforcement-learning model is running on a second computing device.

20. The method of claim 16, wherein a first state associated with the first user interface is known and a second state associated with the second user interface is unknown.

\* \* \* \* \*